(12) United States Patent
Kang et al.

(10) Patent No.: US 11,153,033 B2
(45) Date of Patent: Oct. 19, 2021

(54) METHOD AND APPARATUS FOR TRANSMITTING AND RECEIVING A SIGNAL ON PUSCH IN A WIRELESS COMMUNICATION

(71) Applicant: LG Electronics Inc., Seoul (KR)

(72) Inventors: Jiwon Kang, Seoul (KR); Hyungtae Kim, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/376,024

(22) Filed: Apr. 5, 2019

(65) Prior Publication Data

US 2019/0319739 A1    Oct. 17, 2019

(30) Foreign Application Priority Data

Apr. 5, 2018 (KR) .................. 10-2018-0039488

(51) Int. Cl.
*H04W 72/04*  (2009.01)
*H04L 1/00*  (2006.01)
*H04B 7/0456*  (2017.01)
*H04B 7/0417*  (2017.01)
*H04B 7/06*  (2006.01)

(52) U.S. Cl.
CPC ......... *H04L 1/0026* (2013.01); *H04B 7/0417* (2013.01); *H04B 7/0456* (2013.01); *H04B 7/0617* (2013.01); *H04B 7/0626* (2013.01); *H04W 72/042* (2013.01); *H04W 72/046* (2013.01); *H04W 72/0446* (2013.01)

(58) Field of Classification Search
CPC .............. H04L 1/0026; H04W 72/042; H04W 72/0446; H04W 72/046; H04B 7/0456; H04B 7/0417; H04B 7/0626; H04B 7/0617
See application file for complete search history.

(56) References Cited

U.S. PATENT DOCUMENTS

| | | | |
|---|---|---|---|
| 2018/0242280 A1* | 8/2018 | Axmon | H04W 28/0273 |
| 2019/0029052 A1* | 1/2019 | Yang | H04L 1/1861 |
| 2019/0208436 A1* | 7/2019 | Zhou | H04W 72/042 |
| 2019/0268089 A1* | 8/2019 | Fu | H04W 72/042 |
| 2019/0312627 A1* | 10/2019 | Aiba | H04B 7/061 |
| 2019/0394009 A1* | 12/2019 | Yoshimoto | H04W 72/04 |
| 2020/0029323 A1* | 1/2020 | Baldemair | H04L 5/0053 |
| 2020/0084752 A1* | 3/2020 | Strom | H04W 72/042 |
| 2020/0169364 A1* | 5/2020 | Hao | H04W 72/042 |

OTHER PUBLICATIONS

Yang et al., U.S. Appl. No. 62/437,040, filed Dec. 20, 2016.*

* cited by examiner

*Primary Examiner* — Lakeram Jangbahadur
(74) *Attorney, Agent, or Firm* — Dentons US LLP

(57) ABSTRACT

A method and apparatus for transmitting signals on a PUSCH in a wireless communication system are provided. Specifically, a method performed by a terminal includes receiving resource information for transmitting uplink data and channel state information (CSI) on a PUSCH from a base station; receiving first downlink control information (DCI) including control information on slot timing related to the uplink data transmission from the base station; comparing a first time related to computation of the uplink data and CSI and a second time related to computation of only the CSI; and transmitting, if a value of the slot timing is greater than the second time and smaller than the first time, only the CSI on the PUSCH to the base station.

10 Claims, 10 Drawing Sheets

FIG. 4
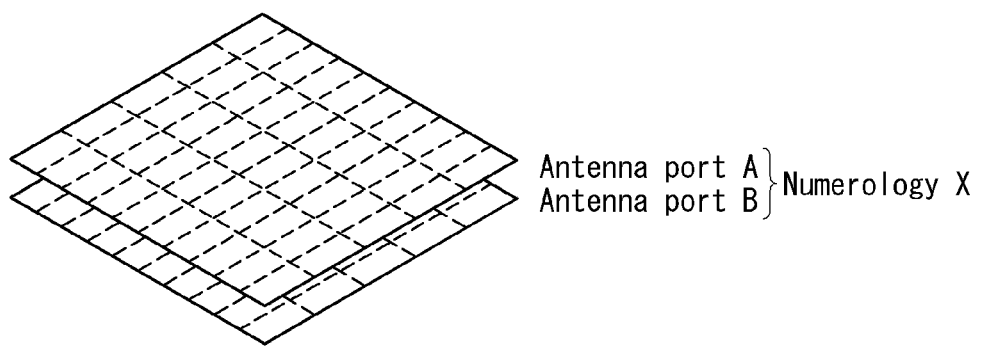
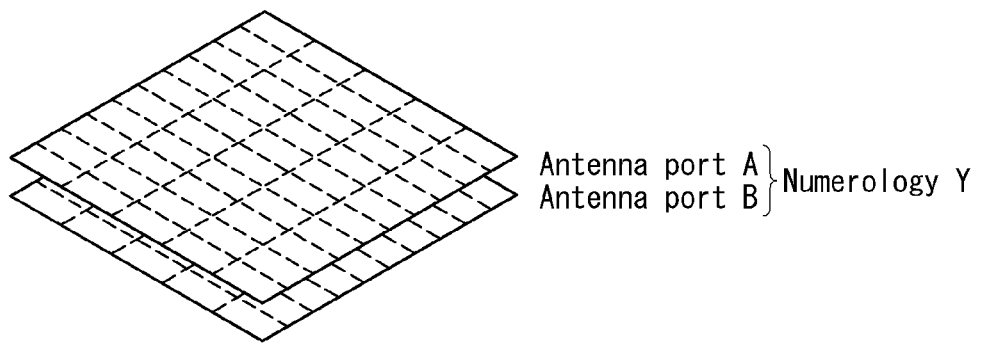

FIG. 6
(a)
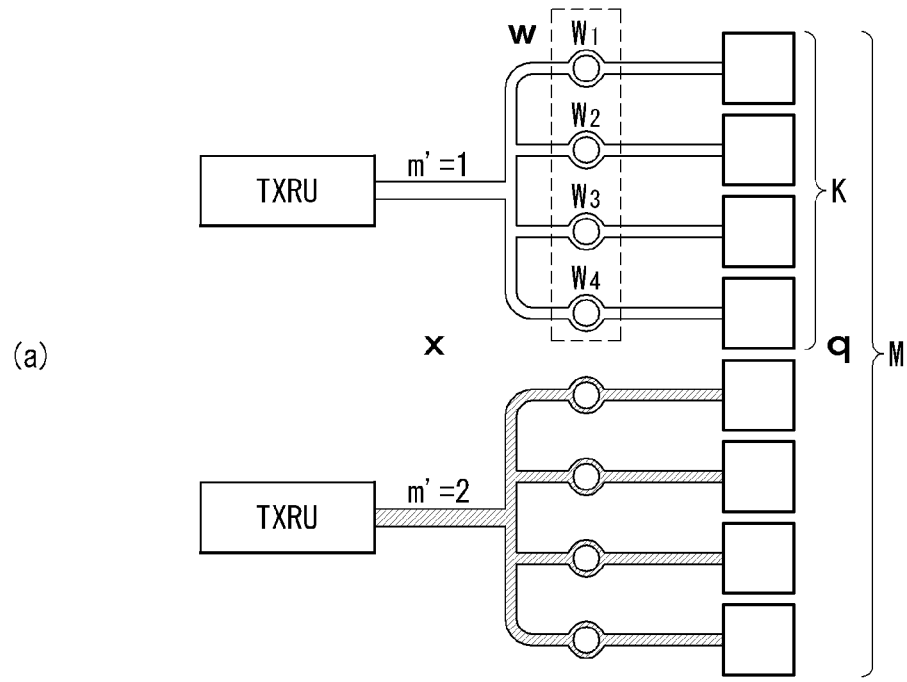
(b)
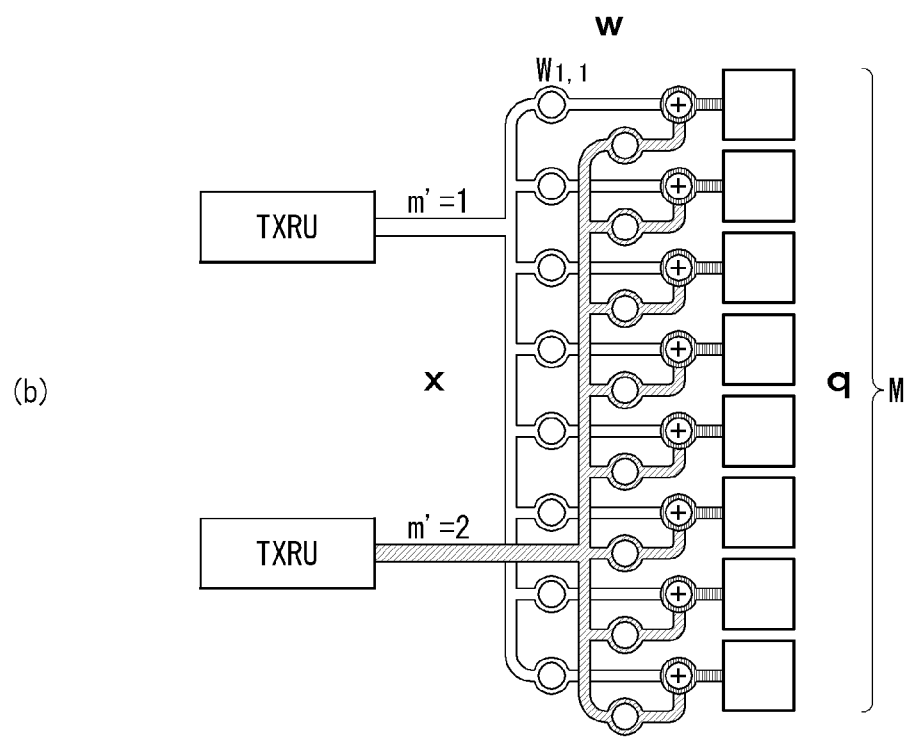

METHOD AND APPARATUS FOR TRANSMITTING AND RECEIVING A SIGNAL ON PUSCH IN A WIRELESS COMMUNICATION

CROSS-REFERENCE TO RELATED APPLICATIONS

This application claims the benefit of KR Application No. 10-2018-0039488 filed on Apr. 5, 2018. The contents of this application are hereby incorporated by reference in its entirety.

BACKGROUND OF THE INVENTION

Field of the Invention

The present invention relates to a wireless communication system, and more particularly, to a method of transmitting and receiving signals on a PUSCH and a device supporting the same.

Related Art

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

SUMMARY OF THE INVENTION

The present specification provides a method and device for transmitting and receiving signals on a PUSCH in a wireless communication system.

In this regard, the present specification provides a method of transmitting a signal and an apparatus therefor in consideration of a computation time for transmission of uplink data and Channel State Information (CSI) reporting of a terminal.

Specifically, the present specification provides a method and device for performing CSI reporting and/or UL data transmission through an uplink data channel in consideration of a timing offset related to CSI reporting and/or a timing offset related to transmission of uplink data.

Technical objects to be achieved by the present invention are not limited to the aforementioned technical objects, and other technical objects not described above may be evidently understood by a person having ordinary skill in the art to which the present invention pertains from the following description.

A method performed by a terminal in a method of transmitting a signal on a Physical Uplink Shared Channel (PUSCH) in a wireless communication system includes receiving resource information for transmitting uplink data and channel state information (CSI) on a PUSCH from a base station; receiving first downlink control information (DCI) including control information on slot timing related to the uplink data transmission from the base station; comparing a first time related to computation of the uplink data and CSI and a second time related to computation of only the CSI; and transmitting, if a value of the slot timing is greater than the second time and smaller than the first time, only the CSI on the PUSCH to the base station.

Further, the PUSCH may include a bit sequence of the CSI and a predefined bit sequence.

Further, all of the predefined bit sequence may be 0.

Further, a value of slot timing related to the uplink data transmission may be Y, and a value of the second time may be Z.

Further, the value Z may be received from the base station through second DCI.

Further, the first time may be a time required for transmitting together the uplink data and the CSI after receiving the first DCI, and the second time may be a time required for transmitting only the CSI after receiving the first DCI.

A terminal for transmitting a signal on a Physical Uplink Shared Channel (PUSCH) in a wireless communication system includes a transmitter for transmitting a wireless signal; a receiver for receiving a wireless signal; and a processor functionally connected to the transmitter and the receiver, wherein the processor is configured to control the receiver to receive resource information for transmitting uplink data and channel state information (CSI) on a PUSCH from a base station; to control the receiver to receive first downlink control information (DCI) including control information on slot timing related to the uplink data transmission from the base station; to compare a first time related to computation of the uplink data and the CSI and a second time related to computation of only the CSI; and to control the transmitter to transmit only the CSI on the PUSCH to the base station, when a value of the slot timing is greater than the second time and smaller than the first time.

BRIEF DESCRIPTION OF THE DRAWINGS

The accompany drawings, which are included to provide a further understanding of the present invention and are incorporated on and constitute a part of this specification illustrate embodiments of the present invention and together with the description serve to explain the principles of the present invention.

FIG. 4 illustrates examples of an antenna port and a resource grid for each numerology to which a method proposed in the present invention may be applied.

FIG. 6 illustrates examples of a connection method of a TXRU and an antenna element to which a method proposed in the present invention may be applied.

DESCRIPTION OF EXEMPLARY EMBODIMENTS

Figure 1:
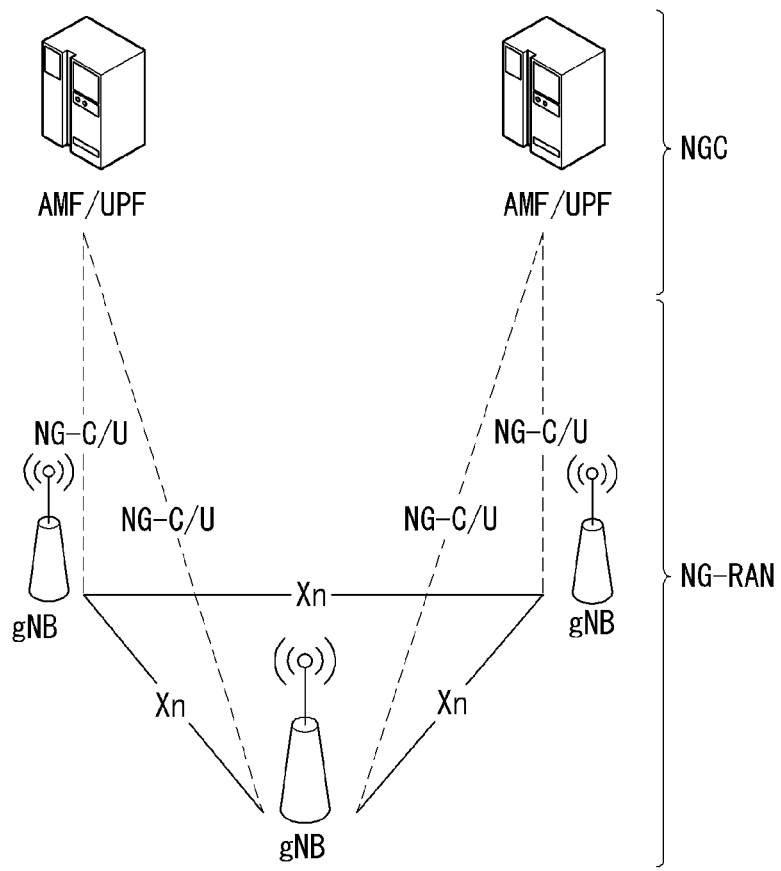
FIG. 1 is a diagram illustrating an example of an overall system structure of NR to which a method suggested in the present specification may be applied.

In what follows, preferred embodiments of the present invention will be described in detail with reference to appended drawings. Detailed descriptions to be disclosed below with reference to the appended drawings are intended to describe illustrative embodiments of the present invention but are not intended to represent the sole embodiment of the present invention. Detailed descriptions below include specific details to provide complete understanding of the present invention. However, it should be understood by those skilled in the art that the present invention may be embodied without the specific details to be introduced.

In some cases, to avoid obscuring the gist of the present invention, well-known structures and devices may be omitted or may be depicted in the form of a block diagram with respect to core functions of each structure and device.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) may be replaced with a term such as fixed station, Node B, evolved-NodeB (eNB), Base Transceiver System (BTS), Access Point (AP), or general NB (gNB). Also, a terminal can be fixed or mobile; and the term may be replaced with a term such as User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the present invention, and the specific terms may be used in different ways as long as it does not leave the technical scope of the present invention.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

The 5G NR defines enhanced Mobile Broadband (eMBB), massive Machine Type Communication (mMTC), Ultra-Reliable and Low Latency Communications (URLLC), and vehicle-to-everything (V2X) depending on usage scenarios.

And the 5G NR standard is divided into standalone (SA) and non-standalone (NSA) modes according to co-existence between the NR system and the LTE system.

And the 5G NR supports various subcarrier spacing and supports CP-OFDM for downlink transmission while CP-OFDM and DFT-s-OFDM (SC-OFDM) for uplink transmission.

The embodiments of the present invention may be supported by standard documents disclosed for at least one of wireless access systems such as the IEEE 802, 3GPP, and 3GPP2. In other words, those steps or portions among embodiments of the present invention not described to clearly illustrate the technical principles of the present invention may be backed up by the aforementioned documents. Also, all of the terms disclosed in the present document may be described by the aforementioned standard documents.

For the purpose of clarity, descriptions are given mainly with respect to the 3GPP LTE/LTE-A, but the technical features of the present invention are not limited to the specific system.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to an Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or P). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta_{max}N_f/100) \cdot T_s=10$ ms. The radio frame is composed of ten subframes each having a section of $T_{sf}=(\Delta f_{max}N_f/1000) \cdot T_s=1$ ms. In this case, there may be a set of UL frames and a set of DL frames.

Figure 2:
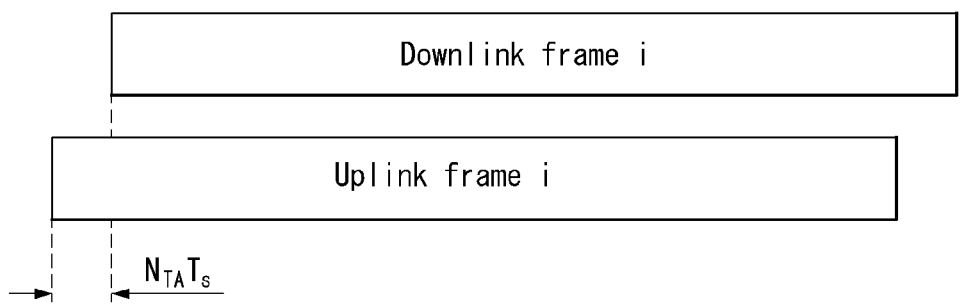
FIG. 2 illustrates a relationship between an uplink frame and a downlink frame in a wireless communication system to which a method proposed in the present invention may be applied.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology $\mu$, slots are numbered in ascending order of $N_s^{\mu} \in \{0, \ldots, N_{subframe}^{slots,\mu}-1\}$ in a subframe, and in ascending order of $n_{s,f}^{\mu} \in \{0, \ldots, N_{frame}^{slots,\mu}-1\}$ in a radio frame. One slot is composed of continuous OFDM symbols of $N_{symb}^{\mu}$, and $N_{symb}^{\mu}$ determined depending on a numerology in use and slot configuration. The start of slots $n_s^{\mu}$ in a subframe is temporally aligned with the start of OFDM symbols $n_s^{\mu}N_{symb}^{\mu}$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology $\mu$, and Table 3 shows the number of OFDM symbols per slot for an extended CP in the numerology $\mu$.

TABLE 2

| | | | | Slot configuration | | |
|---|---|---|---|---|---|---|
| | | 0 | | | 1 | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | | | | Slot configuration | | |
|---|---|---|---|---|---|---|
| | | 0 | | | 1 | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
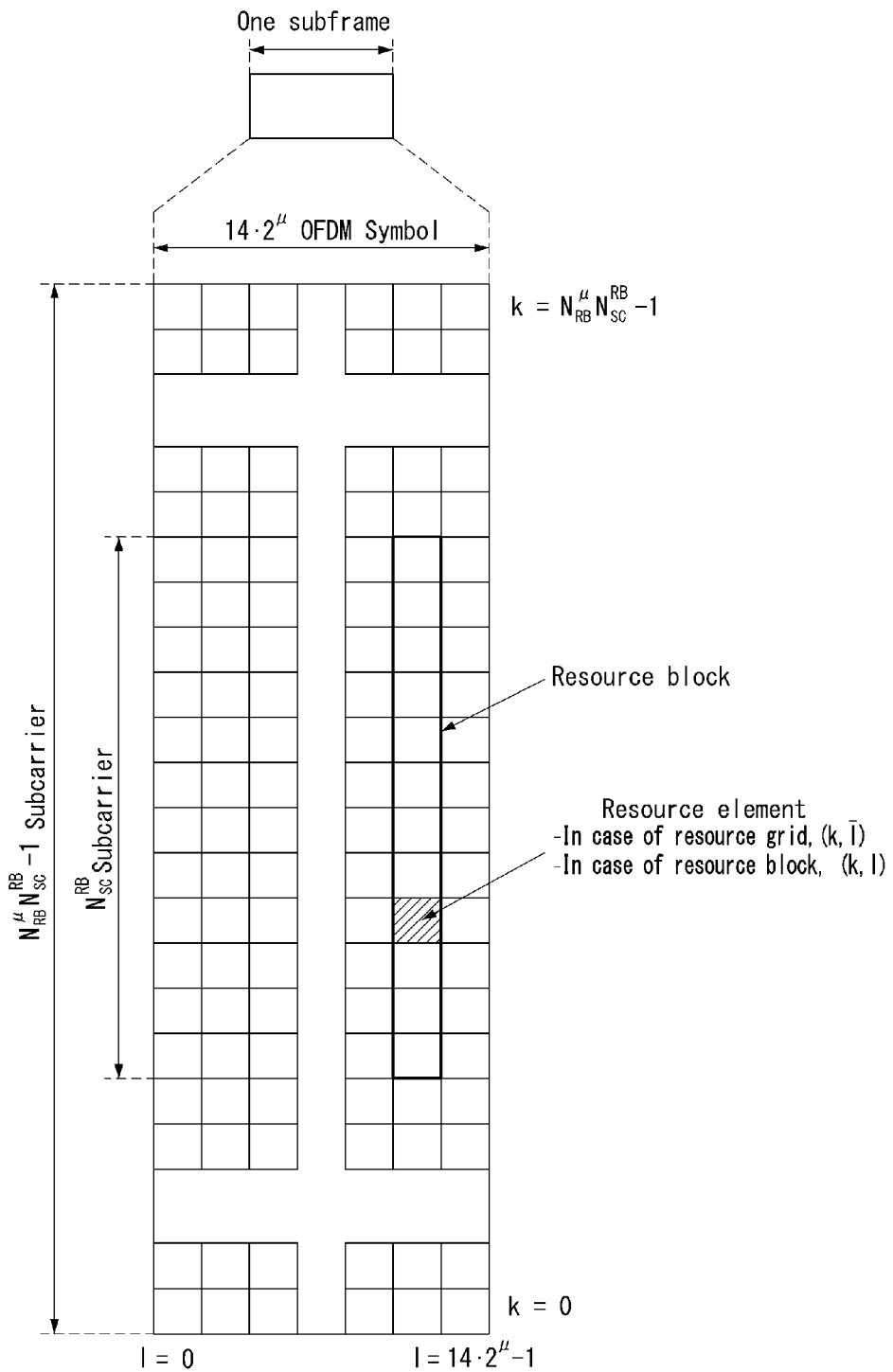
FIG. 3 illustrates an example of a resource grid supporting in a wireless communication system to which a method proposed in the present specification may be applied.

FIG. 3 illustrates an example of a resource grid supported in a wireless communication system to which a method proposed by the present disclosure may be implemented.

Referring to FIG. 3, a resource grid is composed of $N_{RB}^{\mu} N_{sc}^{RB}$ subcarriers in a frequency domain, each subframe composed of $14 \cdot 2\mu$ OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols Herein, $N_{RB}^{\mu} \leq N_{RB}^{max,\mu}$. The above $N_{RB}^{max,\mu}$ the maximum transmission bandwidth, and it may change not just between numerologies, but between UL and DL.

In this case, as illustrated in FIG. 3, one resource grid may be configured for the numerology $\mu$ and an antenna port p.

FIG. 4 shows an example of resource ports of an antenna port and a numerology by which the method proposed in the present invention can be applied.

Each element of the resource grid for the numerology $\mu$ and the antenna port p is indicated as a resource element, and may be uniquely identified by an index pair (k,l̄). Herein, $k=0, \ldots, N_{RB}^{\mu} N_{sc}^{RB}-1$ is an index in the frequency domain, and $\bar{l}=0, \ldots, 2^{\mu} N_{symb}^{(\mu)}-1$ indicates a location of a symbol in a subframe. To indicate a resource element in a slot, the index pair (k,l̄) is used. Herein, $l=0, \ldots, N_{symb}^{\mu}-1$.

The resource element (k,l̄) for the numerology $\mu$ and the antenna port p corresponds to a complex value $a_{k,\bar{l}}^{(p,\mu)}$. When there is no risk of confusion or when a specific antenna port or numerology is specified, the indexes p and $\mu$ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Beam Management

In NR, beam management is defined as follows.

Beam management: includes at least the following description as a set of L1/L2 procedures for obtaining and maintaining a set of TRP(s) and/or UE beams that may be used for DL and UL transmission and reception:

Beam determination: an operation in which the TRP(s) or the UE selects a transmitting/receiving beam thereof.

Beam measurement: an operation in which the TRP(s) or the UE measures characteristics of a received beamforming signal.

Beam reporting: an operation in which the UE reports information of a beamformed signal based on beam measurement.

Beam sweeping: an operation that covers a spatial region using a beam transmitted and/or received during a time interval in a predetermined manner.

Further, Tx/Rx beam correspondence in the TRP and UE is defined as follows.

When at least one of the following conditions is satisfied, Tx/Rx beam correspondence in the TRP is maintained.

The TRP may determine a TRP reception beam for uplink reception based on downlink measurement of the UE for one or more transmission beams thereof.

The TRP may determine a TRP Tx beam for downlink transmission based on uplink measurement thereof for one or more Rx beams thereof.

When at least one of the following conditions is satisfied, Tx/Rx beam correspondence at the UE is maintained.

The UE may determine a UE Tx beam for uplink transmission based on downlink measurement thereof for one or more Rx beams thereof.

The UE may determine a UE reception beam for downlink reception based on an indication of TRP based on uplink measurement of one or more Tx beams.

A capability indication of UE beam correspondence related information is supported with TRP.

The following DL L1/L2 beam management procedures are supported within one or more TRPs.

P-1: P-1 is used for enabling UE measurement of different TRP Tx beams in order to support selection of TRP Tx beam/UE Rx beam(s).

Beamforming in TRP generally includes intra/inter-TRP Tx beam sweep in different beam sets. For beamforming at the UE, beamforming generally includes UE Rx beam sweep from a set of different beams.

P-2: UE measurement for different TRP Tx beams are used for changing inter/intra-TRP Tx beam(s).

P-3: When the UE uses beamforming, UE measurement of the same TRP Tx beam is used for changing a UE Rx beam Aperiodic reporting triggered by at least the network is supported in P-1, P-2, and P-3 related operations.

UE measurement based on RS for beam management (at least CSI-RS) is configured with K (total number of beams) beams, and the UE reports measurement results of the selected N number of Tx beams. Here, N is not necessarily a fixed number. Procedures based on RS for mobility purposes are not excluded. When at least N<K, reporting information includes information representing a measurement quantity of the N number of beam(s) and the N number of DL transmission beams. In particular, for K'>1 non-zero-power (NZP) CSI-RS resources, the UE may report a CSI-RS resource indicator (CRI) of N'.

The UE may be set with the following higher layer parameters for beam management.

N≥1 reporting setting, M≥1 resource setting

Links between reporting setting and resource setting are set in agreed CSI measurement setting.

CSI-RS-based P-1 and P-2 are supported with resource and reporting settings.

P-3 may be supported regardless of presence or absence of reporting setting.

Reporting setting including at least the following contents:

Information representing the selected beam

L1 measurement reporting

Time domain operations (e.g., aperiodic operation, periodic operation, semi-persistent operation)

Frequency granularity when several frequency granularity is supported

Resource setting including at least the following contents:

Time domain operation (e.g., aperiodic operation, periodic operation, semi-persistent operation)

RS type: at least NZP CSI-RS

At least one CSI-RS resource set. Each CSI-RS resource set includes K≤1 CSI-RS resources (some parameters of the K number of CSI-RS resources may be the same. For example, port number, time domain operation, density and period)

Further, NR supports the following beam reporting in consideration of L group of L>1.

Information representing a minimal group

Measurement quantity of N1 beam (L1 RSRP and CSI reporting support (when CSI-RS is for CSI acquisition)

If applicable, information representing the N1 number of DL transmission beams

The above-described group-based beam reporting may be configured in UE units. Further, the group-based beam reporting may be turned off in UE units (e.g., when L=1 or N1=1).

NR supports that the UE may trigger a mechanism that recovers from beam failure.

A beam failure event occurs when a quality of a beam pair link of a related control channel is sufficiently low (e.g., comparison with a threshold value, timeout of a related timer). A mechanism that recovers from a beam failure (or fault) is triggered when a beam fault occurs.

The network is explicitly configured in the UE having resources for transmitting UL signals for a recovery purpose. A configuration of resources is supported at a location in which the BS listens from all or some directions (e.g., random access region).

An UL transmission/resource reporting the beam fault may be located at the same time instance as that of a PRACH (resource orthogonal to a PRACH resource) or may be located at a time instance (may be configured for UE) different from that of the PRACH. Transmission of the DL signal is supported so that the UE may monitor a beam to identify new potential beams.

NR supports beam management regardless of a beam-related indication. When a beam-related indication is provided, information about a UE side beamforming/receiving procedure used for CSI-RS based measurement may be indicated to the UE through QCL. As QCL parameters to be supported in the NR, parameters for delay, Doppler, average gain, etc., used in an LTE system as well as spatial parameters for beamforming at a receiving terminal will be added, and QCL parameters to be supported in the NR may include an angle of arrival related parameters in terms of UE receiving beamforming and/or an angle of departure related parameters in terms of BS receiving beamforming. The NR supports use of the same or different beams in the control channel and the corresponding data channel transmission.

For NR-PDCCH transmission supporting robustness of beam pair link blocking, the UE may be configured to simultaneously monitor an NR-PDCCH on the M number of beam pair links. Here, M≥1 and a maximum value of M may depend on at least a UE capability.

The UE may be configured to monitor an NR-PDCCH on different beam pair link(s) in different NR-PDCCH OFDM symbols. Parameters related to UE Rx beam setting for monitoring the NR-PDCCH on multiple beam pair links are configured by higher layer signaling or MAC CE and/or are considered in a search space design.

At least NR supports an indication of a spatial QCL hypothesis between a DL RS antenna port(s) and a DL RS antenna port(s) for demodulation of a DL control channel. A candidate signaling method for a beam indication of the NR-PDCCH (i.e., configuration method of monitoring the NR-PDCCH) is a combination of MAC CE signaling, RRC signaling, DCI signaling, specification transparent, and/or an implicit method, and signaling methods thereof.

For reception of a unicast DL data channel, the NR supports an indication of a spatial QCL hypothesis between the DL RS antenna port and the DMRS antenna port of the DL data channel.

Information representing the RS antenna port is displayed through DCI (downlink grant). Further, the information represents the DMRS antenna port and the RS antenna port being QCL. A different set of the DMRS antenna port of the DL data channel may be represented as a different set of the RS antenna port and QCL.

Hereinafter, before describing in detail the methods proposed in the present specification, contents directly or indirectly related to the methods proposed in the present specification will be first briefly described.

In next generation communication such as 5G and New Rat (NR), as more communication devices require a larger communication capacity, there is a need for more improved mobile broadband communication than existing radio access technology (RAT).

Further, Machine Type Communications (massive MTC), which provides various services at any time and place by connecting multiple devices and objects, is one of major issues to be considered in next generation communication.

Further, a design or structure of a communication system considering a service and/or a UE sensitive to reliability and latency is being discussed.

In this way, the introduction of next generation radio access technology (RAT) considering enhanced mobile broadband (eMBB) communication, massive MTC (mMTC) and Ultra-Reliable and Low Latency Communication (URLLC) is being currently discussed, and in the present specification, for convenience, the corresponding technology is referred to as 'new RAT (NR)'.

Self-Contained Slot Structure

Figure 5:
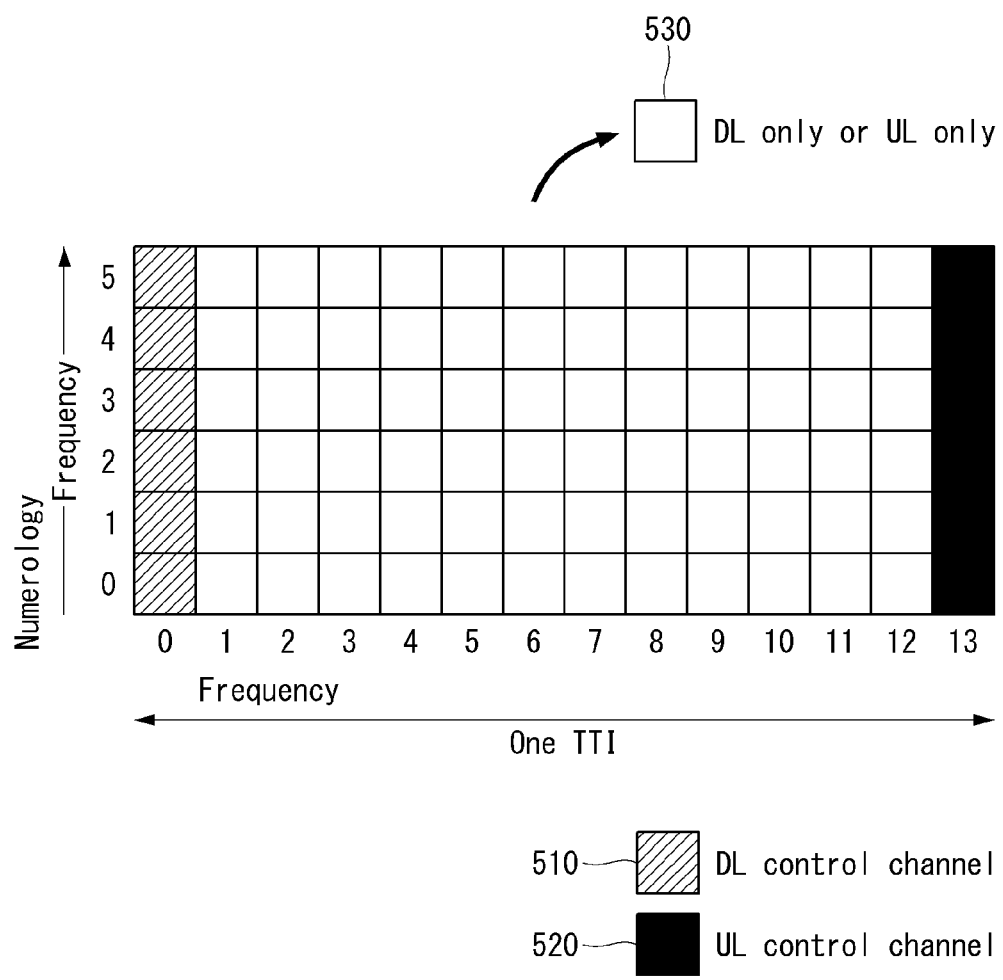
FIG. 5 is a diagram illustrating an example of a self-contained slot structure to which a method proposed in the present specification may be applied.

In order to minimize latency of data transmission in a TDD system, fifth generation New RAT (NR) considers a self-contained slot structure of FIG. 5.

That is, FIG. 5 is a diagram illustrating an example of a self-contained slot structure to which a method proposed in the present specification may be applied.

In FIG. 5, a hatched area 510 represents a downlink control area, and a black portion 520 represents an uplink control area.

A portion 530 with no mark may be used for downlink data transmission or for uplink data transmission.

Such a structure is characterized in that DL transmission and UL transmission may be sequentially performed in one slot and that DL data may be transmitted in one slot and that UL Ack/Nack may be transmitted/received in one slot.

Such a slot may be defined to a 'self-contained slot'.

That is, through such a slot structure, the BS reduces a time taken to retransmit data to the UE in the event of a data transmission error, thereby minimizing latency of final data transmission.

In such a self-contained slot structure, the BS and the UE require a time gap for a process for switching from a transmission mode to a reception mode or switching from a reception mode to a transmission mode.

For this reason, in the corresponding slot structure, some OFDM symbols of a time point of switching from a DL to an UL are set to a guard period (GP).

Analog Beamforming

In a millimeter wave (mmW), because a wavelength is shortened, a plurality of antenna elements may be installed in the same area.

That is, total 64 (8×8) antenna elements may be installed in 2-dimension array form at 0.5 lambda (wavelength) interval in a panel of 4×4 cm with a wavelength of 1 cm in 30 GHz band.

Therefore, in the mmW, by increasing a beamforming (BF) gain using multiple antenna elements, coverage is increased or throughput is increased.

In this case, when a Transceiver Unit (TXRU) is provided to adjust transmission power and phase for each antenna element, independent beamforming is available for each frequency resource.

However, installing a TXRU in all of about 100 antenna elements has a problem of ineffectiveness in a price aspect.

Therefore, a method of mapping a plurality of antenna elements to one TXRU and adjusting a direction of a beam with an analog phase shifter is considered.

Such an analog beamforming method has a disadvantage in that the method may not perform frequency selective beamforming because the method may make only one beam direction in all bands.

For this reason, a hybrid BF (HBF) having the B number of TXRUs fewer than the Q number of antenna elements as an intermediate form of a Digital BF and an analog BF may be considered.

Although the HBF is different according to a connection method of the B number of TXRUs and the Q number of antenna elements, directions of beams that may be transmitted simultaneously is limited to the B number or less.

FIG. 6 illustrates examples of a connection method of a TXRU and an antenna element to which a method proposed in the present invention may be applied.

Here, a TXRU virtualization model represents the relationship between an output signal of the TXRU and an output signal of antenna elements.

FIG. 6(a) illustrates an example of a method in which a TXRU is connected to a sub-array.

Referring to FIG. 6(a), the antenna element is connected to only one TXRU. Unlike FIG. 6(a), FIG. 6(b) illustrates a method in which a TXRU is connected to all antenna elements.

That is, in the case of FIG. 6(b), the antenna element is connected to all TXRUs.

In FIG. 6, W represents a phase vector multiplied by an analog phase shifter.

That is, a direction of analog beamforming is determined by W. Here, mapping between CSI-RS antenna ports and TXRUs may be 1-to-1 or 1-to-many.

CSI Feedback

In a 3GPP LTE(-A) system, a user equipment (UE) is defined to report channel state information (CSI) to a BS.

Herein, the CSI refers to as information that may represent a quality of a radio channel (or refers to as a 'link') formed between the UE and the antenna port.

For example, the CSI may correspond to a rank indicator (RI), a precoding matrix indicator (PMI), a channel quality indicator (CQI), and the like.

Here, RI represents rank information of a channel, which means the number of streams in which the UE receives through the same time-frequency resource. Because this value is determined by being dependent on long term fading of the channel, the value is fed back from the UE to the BS with a period longer than the PMI and CQI.

The PMI is a value reflecting a channel space characteristic and represents a preferred precoding index of the UE based on a metric such as SINR.

The CQI is a value representing intensity of a channel, which generally means a reception SINR in which the BS may obtain when using the PMI.

In a 3GPP LTE (-A) system, the BS may set a plurality of CSI processes to UEs and receive CSI reporting for each process.

Here, the CSI process is configured with CSI-RS for specifying a signal quality from the BS and a CSI-interference measurement (CSI-IM) resource for interference measurement.

RS Virtualization

In mmW, a PDSCH may be transmitted only in one analog beam direction at one point by analog beamforming.

Therefore, the BS transmits data to only a small number of UEs in a specific direction.

Accordingly, if necessary, by setting differently a direction of an analog beam for each antenna port, data may be simultaneously transmitted to a plurality of UEs located in several analog beam directions.

Figure 7:
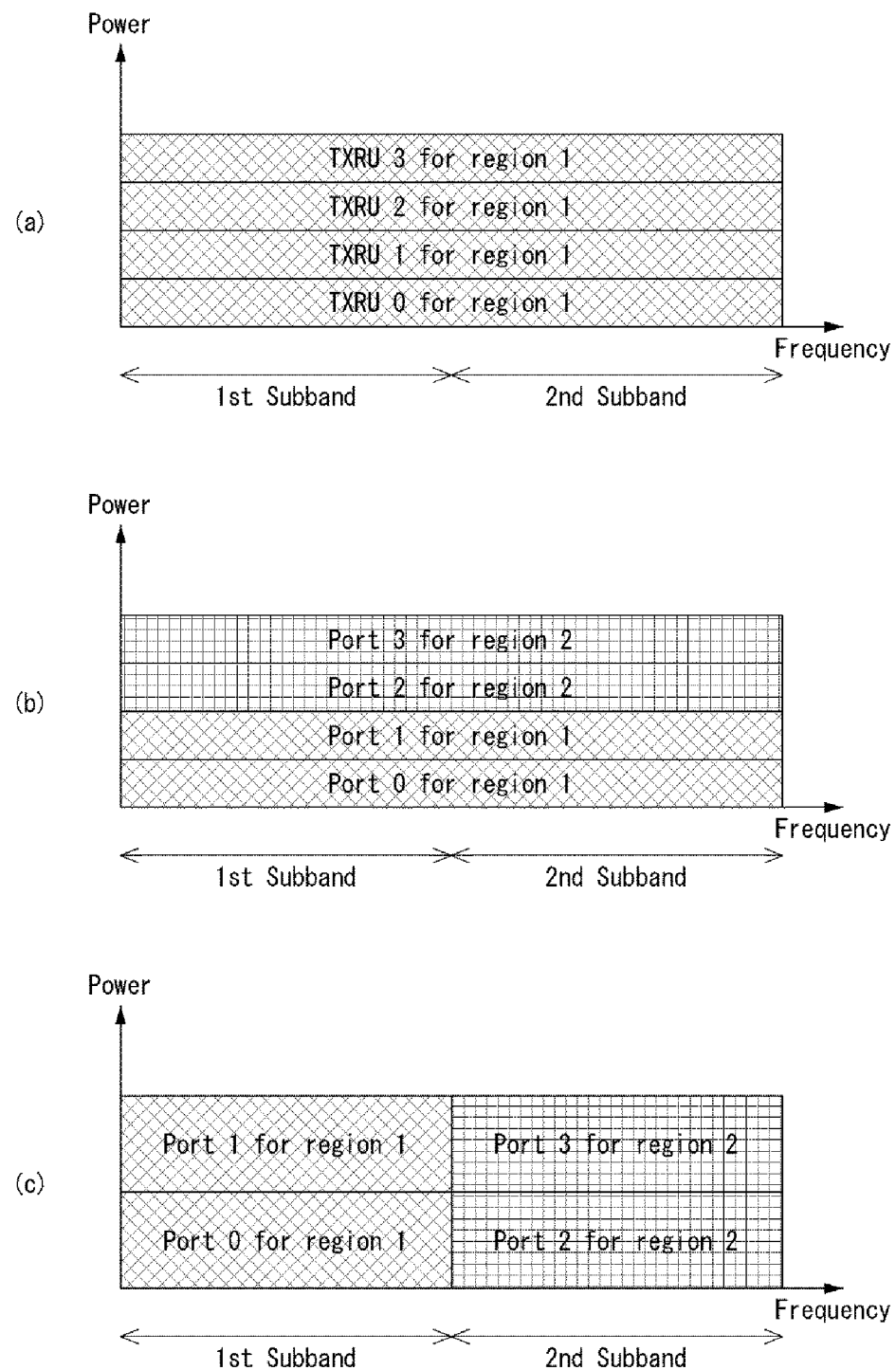
FIG. 7 illustrates various examples of a service region for each TXRU to which a method proposed in the present specification may be applied.

FIG. 7 illustrates various examples of a service area for each TXRU to which a method proposed in the present specification may be applied.

FIG. 7 exemplifies a structure in which 4 sub-arrays are formed by dividing 256 antenna elements into 4 and in which TXRUs are connected to each sub-array.

When each sub-array is configured with total 64 (8×8) antenna elements in a 2-dimensional array form, the each sub-array may cover a region corresponding to a horizontal angle area of 15° and a vertical angle area of 15° by specific analog beamforming.

That is, a region to be serviced by the BS is divided into a plurality of regions, and one region is serviced at one time.

In the following description, it is assumed that the CSI-RS antenna port and the TXRU are mapped in 1-to-1.

Therefore, the antenna port and the TXRU may be interpreted as having the same meaning in the following description.

As shown in FIG. 7(a), when all TXRUs (antenna ports, sub-arrays) have the same analog beamforming direction, a digital beam having a higher resolution may be formed to increase throughput of a corresponding region.

Further, by increasing a rank of transmission data to the corresponding region, throughput of the corresponding region may be increased.

Further, as shown in FIG. 7(b), when each TXRU (antenna port, sub-array) has different analog beamforming directions, data may be transmitted simultaneously from the corresponding subframe (SF) to UEs distributed in a wider region.

As shown in FIG. 7(b), two of four antenna ports are used for PDSCH transmission to an UE1 in a region 1 and the remaining two are used for PDSCH transmission to an UE2 in a region 2.

Further, FIG. 7(b) illustrates an example in which a PDSCH 1 transmitted to the UE 1 and a PDSCH 2 transmitted to the UE 2 are Spatial Division Multiplexed (SDM).

Alternatively, as shown in FIG. 7(c), the PDSCH 1 transmitted to the UE 1 and the PDSCH 2 transmitted to the UE 2 may be Frequency Division Multiplexed (FDM) and transmitted.

Among a method of servicing one region using all antenna ports and a method of dividing antenna ports and simultaneously servicing several regions, in order to maximize cell throughput, a preferred method may be changed according to RANK and MCS that service to the UE.

Further, a preferred scheme is changed according to an amount of data to be transmitted to each UE.

The BS calculates cell throughput or scheduling metric that may obtain when servicing one region using all antenna ports and calculates cell throughput or scheduling metric that may be obtained when servicing two regions by dividing the antenna ports.

The BS compares cell throughput or scheduling metric that may obtain through each scheme to select a final transmission scheme.

As a result, the number of antenna ports participating in PDSCH transmission is changed by SF-by-SF.

In order to calculate transmission MCS of the PDSCH according to the number of antenna ports and to reflect the transmission MCS to scheduling algorithm, CSI feedback from the UE appropriate thereto is required.

Channel State Information Feedback

In most cellular systems including a legacy LTE system, a UE receives a pilot signal (e.g., reference signal (RS)) for channel estimation from a BS to calculate channel state information (CSI) and reports the calculated value to the BS. The BS transmits a data signal (i.e., downlink data) based on CSI information fed back from the UE. In the LTE system, the CSI information fed back by the UE includes channel quality information (Cal), a precoding matrix index (PMI), and a rank indicator (RI). Hereinafter, CQI feedback, PMI feedback, and RI feedback will be described in detail.

First, CQI feedback is radio channel quality information to be provided by the UE to the BS in order to provide information on a modulation and coding scheme (MCS) to apply when the BS transmits data. When a radio quality between the BS and the UE is high, the UE feeds back a high CQI value to the BS. The BS, having received feedback of a high CQI value transmits data with a relatively high modulation order and a low channel coding rate. Alternatively, when a radio quality between the BS and the UE is low, the UE feeds back a low CQI value to the BS. The BS, having received feedback of a low CQI value transmits data with a relatively low modulation order and a high channel coding rate.

Next, when the BS installs a multiple-antenna, PMI feedback is preferred precoding matrix information to be provided by the UE to the BS in order to provide information on Multiple-Input Multiple-Output (MIMO) precoding scheme to apply. The UE estimates a downlink MIMO channel between the BS and the UE from the pilot signal and transfers information on efficient MIMO precoding when the BS applies through PMI feedback. In an LTE system, only linear MIMO precoding that may be represented in a matrix form in a PMI configuration is considered.

In this case, the BS and the UE share a codebook configured with a plurality of precoding matrices, and each MIMO precoding matrix in the codebook has a unique index. Accordingly, by feeding back an index corresponding to a most preferred MIMO precoding matrix in the codebook through PMI, the UE minimizes a feedback information amount thereof. In this case, it is not always necessary that the PMI value is configured with only one index.

For example, in an LTE system, when the number of transmitting antenna ports is 8, it may be set to derive final 8 transmitting (tx) MIMO precoding matrixes only when two indexes (e.g., W1 and W2) are coupled. W1 corresponding to first PMI is fed back to a longer period (e.g., long term) and has a wideband attribute and may be thus generally referred to as wideband PMI. Further, W2 corresponding to second PMI is fed back with a shorter period (e.g., short term) and has a subband attribute and may be thus referred to as subband PMI.

In this case, a final precoder may be configured as a product of W1 and W2. Here, W1 may be set to select a beam group for each polarization in a cross-polarization antenna environment, and W2 may be set for co-phasing between final beam selection and cross-polarization at each polarization. There may be a case where the number of beams belonging to a beam group is one, and in this case, W2 may be set only for co-phasing. When selecting the number of beams belonging to a beam group and the beam group, the BS may designate a codebook setting parameter for the number of beams belonging to a beam group and the beam group to select based on which pattern of an index combination of a vertical beam and a horizontal beam.

Next, RI feedback is information on the preferred number of transmission layers in which the UE provides to the BS in order to provide information on the number of transmission layers preferred by the UE when the BS and the UE may perform multi-layer transmission through spatial multiplexing by installing multiple antennas. In this case, RI has a close relationship with the PMI and this is because the BS should know precoding to be applied to each layer according to the number of transmission layers.

In a PMI/RI feedback configuration, a method may be considered in which a UE feeds back by configuring a PMI codebook based on single layer transmission and defining PMI on a layer basis. However, such a method has a disadvantage that an amount of information of PMI/RI feedback greatly increases as the number of transmission layers increases. Therefore, in the case of the LTE system, a PMI codebook according to each transmission layer number is defined. That is, for R-layer transmission, the N number of matrices of magnitude Nt×R are defined in the codebook. Here, R means the number of layers, Nt means the number of transmitting antenna ports, and N means a size of the codebook. Therefore, in the case of the LTE system, a size of the PMI codebook is defined regardless of the number of transmission layers. In this case, the number R of transmission layers corresponds to a rank value of a precoding matrix (Nt×R matrix).

Further, in full dimension (FD)-MIMO of the LTE system, a non-precoded CSI-RS based class A operation and a beamformed CSI-RS based class B operation were defined. Here, the class A operation has the largest characteristic in that the PMI codebook designed to support horizontal beamforming is extended to support vertical and horizontal beamforming. The class B operation is characterized in that the BS applies and transmits beamforming when transmitting CSI-RS (e.g., transmitting in a manner similar to DMRS), unlike the conventional operation and Class A operation.

For example, a 4-port CSI-RS resource A and a 4-port CSI-RS resource B may be set to apply and transmit beamforming in different directions in resource units. In this case, the UE may select a resource having a superior quality from the two CSI-RS resources and then feed back channel state information (e.g., PMI, CQI, RI) on the corresponding resource. An index related to such CSI-RS resource selection may be referred to as a CSI-RS resource indicator (CRI) and may be fed back together with other channel state information (e.g., PMI, CQI, RI) as a CSI feedback parameter.

In the case of the class B operation, different beamforming may be applied to each port within the same resource. In this case, only a specific port may be selectively used for a port selection codebook or ports may be coupled and used for a port combining codebook.

Further, in enhanced FD-MIMO (eFD-MIMO), technology referred to as a hybrid CSI operation is considered. This is a concept that extends a two-step procedure in which an existing BS transmits CSI-RS and the UE performs CSI computation and feedback to a four-step procedure in which i) the BS transmits CSI-RS and in which ii) the UE performs CSI computation and feedback and in which iii) the BS transmits CSI-RS based on the CSI feedback and in which iv) the UE performs CSI computation and feedback. In this case, the following two mechanisms may be considered.

First, 'hybrid CSI mechanism 1', which is a combination of a class A operation and a class B operation, may be considered. The corresponding mechanism may be set such that i) the BS transmits non-precoded CSI-RS, ii) the UE feeds back RI and (WB) PMI, iii) the BS transmits beamformed CSI-RS based on the feedback information, iv) the UE feeds back the PMI, RI, and CQI for the beamformed CSI-RS.

Next, 'hybrid CSI mechanism 2', which is a combination of two Class B operations, may be considered. The corresponding mechanism may be set such that i) the BS transmits a plurality of beamformed CSI-RS resources, ii) the UE feeds back CRI (thereby, selecting a beam), iii) the BS transmits beamformed CSI-RS ports based on the CRI, and iv) the UE feeds back the PMI, RI, and CQI for the CSI-RS.

The PMI/RI described in the present specification is not limited to mean the PMI/RI in the LTE system, which means an index value of a precoding matrix (Nt×R matrix) and a rank value of the precoding matrix. Further, the PMI described in the present specification means information representing preferred MIMO precoder information among MIMO precoders applicable in a transmitting terminal. In this case, a form of the precoder is not limited to only a linear precoder that may be represented with a matrix. Further, the RI described in the present specification includes all feedback information representing the number of preferred transmission layers and may be interpreted in a wider sense than the RI in LTE.

Such CSI information may be generated for an entire system frequency domain or may be generated for some frequency domain. Particularly, in a wideband system (or a broadband system), a method of generating and feeding back CSI information on preferred some frequency regions (e.g., subband) for each UE may be efficient.

Further, in the LTE system, feedback on the CSI information is performed through an uplink channel. In general, periodic CSI feedback is performed through a Physical Uplink Control Channel (PUCCH), and aperiodic CSI feedback is performed through a Physical Uplink Shared Channel (PUSCH).

A PUCCH CSI reporting mode of periodic CSI feedback performed through the PUCCH may be defined as shown in Table 4. Here, the PUCCH CSI reporting mode means that the UE divides information that should feed back into a mode when the UE performs periodic CSI feedback.

TABLE 4

|  |  | PMI Feedback Type | |
| --- | --- | --- | --- |
|  |  | No PMI (OL, TD, single-antenna) | Single PMI (CL) |
| CQI Feedback Type | Wideband | Mode 1-0<br>RI(only for Open-loop SM)<br>One wideband CQI(4 bit)<br>When RI > 1, CQI of first codeword | Mode 1-1<br>RI<br>Wideband CQI(4 bit)<br>Wideband spatial CQI(3 bit) for R > 1<br>Wideband PMI(4 bit) |
|  | UE selected | Mode 2-0<br>RI(only for Open-loop SM)<br>Best-1 CQI(4 bit) in each BP<br>Best-1 indicator(L-bit label)<br>When RI > 1, CQI of first codeword | Mode 2-1<br>RI<br>Wideband CQI(4 bit)<br>Wideband Spatial CQI(3 bit) for RI > 1<br>Wideband PMI(4 bit)<br>Best-1 CQI(4 bit) in each BP<br>Best-1 spatial CQI(3 bit) for RI > 1<br>Best-1 indicator(L-bit label) |

Unlike periodic CSI feedback, aperiodic CSI feedback is performed temporarily only when the BS requests CSI feedback information. In this case, the BS triggers aperiodic CSI feedback through a downlink control channel such as Physical Downlink Control Channel (PDCCH)/enhanced PDCCH (ePDCCH). A PUSCH CSI reporting mode of information in which the UE should feed back when aperiodic CSI feedback is triggered in the LTE system may be defined as shown in Table 5. In this case, the PUSCH CSI reporting mode in which the UE operates may be indicated through higher layer signaling (i.e., upper layer message).

TABLE 5

| | | PMI Feedback Type | |
|---|---|---|---|
| | | No PMI (OL, TD, single-antenna) | With PMI (CL) |
| PUSCH CQI feedback type | Wideband (wideband CQI) | | Mode 1-2: Multiple PMI RI<br>$1^{st}$ Wideband CQI(4 bit)<br>$2^{nd}$ Wideband CQI(4 bit) if R > 1<br>Subband PMIs on each subband |
| | UE selected (subband CQI) | Mode 2-0: RI(only for Open-loop SM) Wideband CQI(4 bit) + Best-M CQI(2 bit) Best-M index When RI > 1, CQI of first codeword | Mode 2-2: Multiple PMI RI<br>$1^{st}$ Wideband CQI(4 bit) + Best-M CQI(2 bit)<br>$2^{nd}$ Wideband CQI(4 bit) + Best-M CQI if R > 1<br>Wideband PMI Best-M PMI Best-M index |
| | Higher layer-configured (subband CQI) | Mode 3-0: RI(only for Open-loop SM) Wideband CQI(4 bit) + Subband CQI(2 bit) When RI > 1, CQI of first codeword | Mode 3-2: Multiple PMI RI<br>$1^{st}$ Wideband CQI(4 bit) + subbandCQI(2 bit)<br>$2^{nd}$ Wideband CQI(4 bit) + subbandCQI(2 bit) if R > 1<br>Wideband PMI |

Because the PUCCH is smaller than the PUSCH in an amount of data (i.e., payload size) that may transmit at one time, it may be difficult that the PUCCH transmits CSI information at one time. Accordingly, a time point (e.g., subframe) of transmitting CQI and PMI and a time point of transmitting RI may be set differently according to each PUCCH CSI reporting mode. For example, in modes 1-0 of Table 4, the UE may transmit only RI at a specific PUCCH transmission time point and wideband CQI at another PUCCH transmission time point.

Further, the PUCCH reporting type may be defined according to the type of CSI information configured at a specific PUCCH transmission time point. For example, a reporting type that transmits only RI corresponds to type 3, and a reporting type that transmits only broadband CQI corresponds to type 4. A feedback period and an offset value of RI and a feedback period and an offset value of CQI/PMI may be indicated (or set) to the UE through higher layer signaling (i.e., upper layer message).

The above-described CSI feedback information is included in Uplink Control Channel information (UCI).

Beam Reference Signal (BRS)

The BRSs may be transmitted from one or more antenna ports p={0, 1, . . . , 7}.

In relation to sequence generation of the BRS, a reference signal sequence $r_l(m)$ is defined by Equation 2.

$$r_l(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots , 8 \cdot (N_{RB}^{max,DL} - 18) - 1$$

[Equation 2]

In Equation 2, 1 represents an OFDM symbol number with 0 to 13. Further, c(i) means a pseudo-random sequence, and a pseudo-random sequence generator may be initialized to Equation 3 at the beginning of each OFDM symbol.

$$c_{init} = 2^{10} \cdot (7 \cdot (n_s+1) + l'+1) \cdot (2 \cdot N_{ID}^{cell}+1) + 2 \cdot N_{ID}^{cell}+1$$ [Equation 3]

Beam Refinement Reference Signal

Further, in relation to the beam refinement reference signal, the beam refinement reference signals are transmitted through antenna ports up to eight antenna ports (p=600 to 607).

In relation to sequence generation of the beam refinement reference signal, the reference signals $r_{l,n_s}(m)$ are generated, as in Equation 4.

$$r_{l,n_s}(m) = \frac{1}{\sqrt{2}}(1 - 2c(2m)) + j\frac{1}{\sqrt{2}}(1 - 2c(2m+1)),$$

$$m = 0, 1, \ldots , \left\lfloor \frac{3}{8} N_{R,B}^{max,DL} \right\rfloor - 1$$

[Equation 3]

In Equation 4, $n_s$ represents a slot number in a radio frame, and 1 represents an OFDM symbol number in a slot. c(n) means a pseudo-random sequence, and a pseudo-random sequence generator is initialized to Equation 5 at the beginning of each OFDM symbol.

$$c_{init} = 2^{10}(7(\bar{n}_s+1)+l+1)(2N_{ID}^{BRRS}+1)+2N_{ID}^{BRRS}+1$$

$$\bar{n}_s = n_s \bmod 20$$ [Equation 5]

In Equation 5, $N_{ID}^{BRRS}$ is set to the UE through RRC signaling.

DL Phase Noise Compensation Reference Signal

A phase noise compensation reference signal related to an xPDSCH (i.e., the PDSCH supporting in the NR system) is transmitted at an antenna port(s) p=60 and/or p=61 through signaling in a DCI format. Further, the phase noise compensation reference signal is present and/or valid only for xPDSCH transmission related to the corresponding antenna port and is transmitted only in physical resource blocks and symbols to which the corresponding sPDSCH is mapped. Further, the phase noise compensation reference signals are the same in all symbols corresponding to xPDSCH allocation.

In relation to generation of a sequence of the phase noise compensation reference signal, a reference signal sequence r(m) is defined by Equation 6.

$$r(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, \lfloor N_{R,B}^{max,DL}/4 \rfloor - 1$$

[Equation 6]

In Equation (6), c(i) means a pseudo-random sequence, and a pseudo-random sequence generator is initialized to Equation 7 at the beginning of each subframe.

$$c_{init} = (\lfloor n_s/2 \rfloor + 1) \cdot (2n_{ID}^{(nSCID)} + 1) \cdot 2^{16} + n_{SCID}$$ [Equation 7]

In Equation (7), in the case of xPDSCH transmission, $n_{SCID}$ is given by a DCI format related to xPDSCH transmission and is set to 0 in no special case.

Further, in the case of 3-dimensional multiple-input multiple-output (3D-MIMO) or full-dimension multiple-input multiple-output (FD-MIMO) technology, an active antenna system (AAS) having a 2-dimensional planar array structure may be used.

Figure 8:
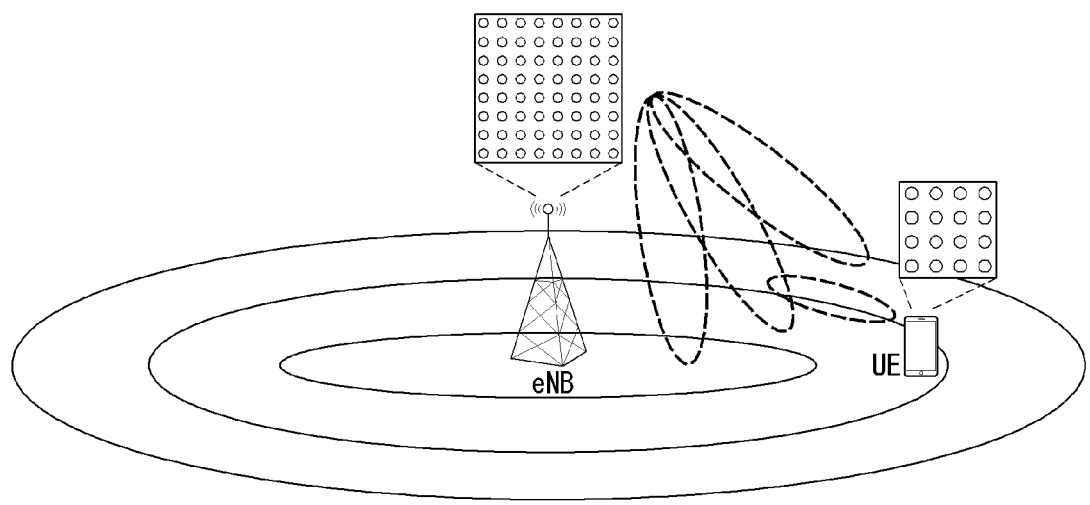
FIG. 8 illustrates an example of a MIMO system using a two-dimensional planar array structure to which a method proposed in the present specification may be applied.

FIG. 8 illustrates an example of a MIMO system using a two-dimensional planar array structure to which the method proposed in the present specification may be applied.

Through the two-dimensional planar array structure, a large number of antenna elements may be packed in available eNB type elements and provide an adaptive electronic capability in a three-dimensional space.

In relation to a MIMO design of the NR system, a CSI framework for channel state measurement and reporting between an eNB and a UE is considered. A CSI framework considered in the NR system will be described in detail hereinafter.

The CSI framework may mean to define a CSI related procedure using CSI reporting setting, resource setting, and CSI measurement setting unlike that a CSI related procedure is defined only in the form of a CSI process in a legacy LTE system. Accordingly, in the NR system, the CSI related procedure may be performed in a more flexible manner according to a channel and/or resource situation.

That is, setting of the CSI related procedure in the NR system may be defined by a combination of the CSI reporting setting, the resource setting, and the CSI measurement setting.

For example, the UE may be set for CSI acquisition with the N≤1 number of CSI reporting settings, the M≤1 number of resource settings, and one CSI measurement setting. Here, the CSI measurement setting may mean setting information on a link relation between the N number of CSI reporting settings and the M number of resource settings. Further, here, the resource settings include reference signal settings (RS settings) and/or interference measurement settings (IM settings).

Figure 9:
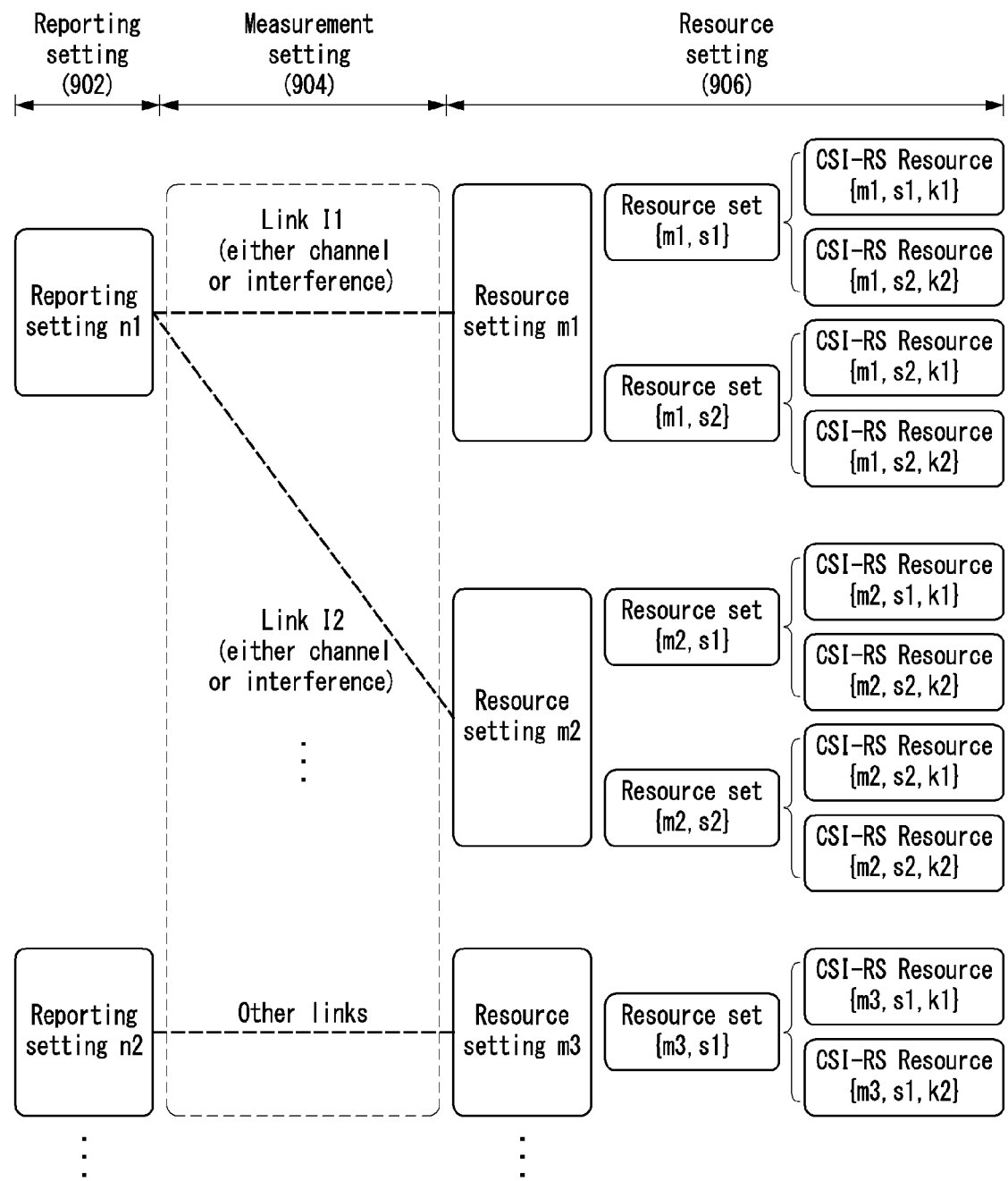
FIG. 9 illustrates an example of a CSI framework considered in an NR system to which a method proposed in the present specification may be applied.

FIG. 9 illustrates an example of a CSI framework considered in an NR system to which the method proposed in the present specification may be applied.

Referring to FIG. 9, the CSI framework may be set to reporting setting 902, measurement setting 904, and resource setting 906. Here, the reporting setting may mean CSI reporting setting, the measurement setting may mean CSI measurement setting, and the resource setting may mean CSI-RS resource setting.

In FIG. 9, a CSI-RS resource is shown, but the present invention is not limited thereto, and the CSI-RS resource may be replaced with a resource for a DL RS available for CSI acquisition or beam management.

As shown in FIG. 9, the reporting setting 902 may be configured with the N (N≤1) number of reporting settings (e.g., reporting setting n1, reporting setting n2).

Further, the resource setting 906 may be configured with the M (M≥1) number of resource settings (e.g., resource setting m1, resource setting m2, resource setting m3). Here, each resource configuration may include the S (S≤1) number of resource sets, and each resource set may include the K (K≤1) number of CSI-RS resources.

Further, the measurement setting 904 may mean setting information representing a link relation between the reporting setting and the resource setting and a measurement type set to the corresponding link. In this case, each measurement setting may include the L (L≤1) number of links. For example, the measurement setting may include setting information about a link (Link 11) between a reporting setting n1 and a resource setting m1 and setting information about a link (Link 12) between a reporting setting n1 and a resource setting m2.

In this case, each of the Link 11 and the Link 12 may be set to any one of a channel measurement link and an interference measurement link. Further, the Link 11 and/or the Link 12 may be set to rate matching or other use.

In this case, one or more CSI reporting settings may be selected dynamically through Layer 1 (L1) or Layer 2 (L2) signaling within one CSI measurement setting. Further, one or more CSI-RS resource sets selected from at least one resource setting and one or more CSI-RS resources selected from at least one CSI-RS resource set may be dynamically selected through L1 or L2 signaling.

Hereinafter, CSI reporting setting, resource setting (i.e., CSI-RS resource setting), and CSI measurement setting constituting a CSI framework considered in the NR system will be described.

CSI Reporting Setting

First, the CSI reporting setting may mean information for setting the type of CSI reporting to be performed by the UE to the eNB, information included in the corresponding CSI reporting, and the like.

For example, the CSI reporting setting may include a time-domain behavior type, a frequency granularity, a CSI parameter to be reported (e.g., Precoding Matrix Indicator (PMI), Rank Indicator (RI), Channel Quality Indicator (CQI)), a CSI type (e.g., CSI Type 1 or 2), codebook setting including a codebook subset restriction, measurement restriction setting, and the like.

In the present specification, the operation type of the time domain may mean an aperiodic operation, a periodic operation, or a semi-persistent operation.

In this case, a setting parameter(s) for the CSI reporting setting may be set (or indicated) through higher layer signaling (e.g., RRC signaling).

Further, in relation to the above-described CSI reporting setting, broadband reporting, partial band reporting, and subband reporting may be supported with three frequency granularities.

Resource Setting

Next, the resource setting may mean information for setting resources to be used for CSI measurement and reporting. For example, the resource setting may include an operation type of a time domain, a type of RS (e.g., non-zero power CSI-RS (NZP CSI-RS), zero power CSI-RS (ZP CSI-RS), DMRS), and a resource set configured with the K number of resources.

As described above, each resource setting may include one or more resource sets, and each resource set may include one or more resources (e.g., CSI-RS resources). Further, the resource setting may include setting of signals for channel measurement and/or interference measurement.

For example, each resource setting may include setting information on the S number of resource sets (e.g., CSI-RS resource set) and include setting information on the K number of resources for each resource set. In this case, each resource set may correspond to a set selected differently from a pool of all CSI-RS resources set to the UE. Further, the setting information on each resource may include information on mapping to the resource element, the number of ports, the operation type of the time domain, and the like.

Alternatively, as another example, each resource setting may include setting information on the S number of CSI-RS resources and/or setting information on the K number of CSI-RS resources of the same number of ports or the smaller number of ports for each CSI-RS resource.

In this case, a CSI-RS RE mapping pattern of the N-port CSI-RS resource may include one or more CSI-RS mapping patterns of CSI-RS resources of the same number of ports or the smaller number of ports (e.g., 2, 4, or 8). Here, the CSI-RS RS mapping pattern may be defined in a slot and may be spanned in a plurality of settable continuous/non-continuous OFDM symbols.

In this case, a setting parameter(s) for the resource setting may be set through higher layer signaling (e.g., RRC signaling).

Further, in the case of each semi-persistent resource setting or periodic resource setting, periodicity may additionally be included in the setting information.

CSI Measurement Setting

Next, the CSI measurement setting may mean setting information representing measurement in which the UE is to perform for specific CSI reporting setting and specific resource setting mapped thereto for CSI reporting. That is, the CSI measurement setting may include information on a link relation between CSI reporting setting and resource setting and include information representing a measurement type of each link. Further, the measurement type may mean channel measurement, interference measurement, rate matching, and the like.

For example, the CSI measurement setting may include information representing CSI reporting setting, information representing resource setting, and setting for a reference transmission scheme in the case of CQI. In this regard, the UE may support the L≤1 number of CSI measurement setting, and a value L may be set according to a capability of the corresponding UE.

In this case, one CSI reporting setting may be connected to one or more resource setting, and multiple CSI reporting setting may be connected to the same resource setting.

In this case, a setting parameter(s) for the CSI measurement setting may be set through higher layer signaling (e.g., RRC signaling).

Further, in the NR system, zero-power (ZPS) CSI-RS-based interference measurement for CSI feedback is supported. Further, aperiodic Interference Measurement Resources (IMR), semi-persistent IMR, and periodic IMR based on ZP CSI-RS for interference measurement for CSI feedback may be supported.

Further, in relation to the above-described CSI reporting setting, resource setting, and CSI measurement setting, the agreement according to an operation type of a time domain is as follows.

First, in the case of periodic CSI-RS (i.e., when transmission of CSI-RS is periodically performed), semi-persistent CSI reporting may be activated/deactivated by MAC CE and/or downlink control information (DCI). Alternatively, aperiodic CSI reporting may be triggered by DCI, but in this case, additional signaling set to MAC CE may be required.

Next, in the case of semi-persistent CSI-RS (i.e., when transmission of CSI-RS is performed semi-persistently), periodic CSI reporting is not supported. However, semi-persistent CSI reporting may be activated/deactivated by MAC-CE and/or DCI, and semi-persistent CSI-RS may be activated/deactivated by MAC-CE and/or DCI. Further, in this case, the aperiodic CSI reporting may be triggered by DCI, and the semi-persistent CSI-RS may be activated/deactivated by MAC-CE and/or DCI.

Finally, in the case of aperiodic CSI-RS (i.e., when transmission of CSI-RS is performed aperiodically), periodic (and semi-persistent) CSI reporting is not supported. However, aperiodic CSI reporting may be triggered by DCI, and aperiodic CSI-RS may be triggered by DC and/or MAC-CE.

With reference to the above description and consensus, the NR system may support three types of time-domain operations in relation to CSI reporting. Here, three types of time-domain operations may mean aperiodic CSI reporting, semi-persistent CSI reporting, and periodic CSI reporting. Similarly, the NR system may support some or all of three types of time-domain operations for reporting related to (analog and/or digital) beams.

As described above, aperiodic CSI reporting may mean that the UE performs CSI reporting only upon triggering. Further, the semi-persistent CSI reporting may mean that the UE performs CSI reporting (according to a specific period) when the corresponding reporting is activated and that the UE stops CSI reporting when the corresponding reporting is inactivated. Further, the periodic CSI reporting may mean that the UE performs CSI reporting according to a preset period and time (e.g., slot offset) through upper layer signaling (e.g., RRC signaling).

Further, even in the case of DL RS for channel measurement in CSI acquisition, the above three types of time-domain operations (e.g., aperiodic CSI-RS, semi-persistent CSI-RS, and periodic CSI-RS) may be supported. Similarly, for DL RS for beam management, all or some of the three types of time-domain operations may be supported. Basically, CSI-RS is considered as DL RS for beam management, but other DL signals may also be used. For example, the DL RS for beam management may be a mobility RS, a beam RS, a synchronization signal (SS), an SS block, and a DL DMRS (e.g., PBCH DMRS, PDCCH DMRS).

As described above, an aperiodic CSI-RS may mean that the UE performs measurement of the CSI-RS only upon triggering. Further, the semi-persistent CSI-RS may mean that the UE performs measurement (according to a specific period) of the CSI-RS when the corresponding CSI-RS is activated and stops measurement of the CSI-RS when the corresponding CSI-RS is inactivated. Further, the periodic CSI-RS may mean that the UE performs measurement of the CSI-RS according to a preset period and time point (e.g., slot offset) through upper layer signaling (e.g., RRC signaling).

Further, as described above, the NR system may support a ZP CSI-RS-based interference measurement method in relation with an interference measurement resource (IMR) in which the eNB designates to the UE upon CSI acquisition. Further, in relation to the interference measurement resource (IMR), at least one of a non-zero-power (NZP) CSI-RS based interference measurement method and a DMRS based interference measurement method may be supported.

In particular, in an LTE system (i.e., legacy LTE system), a ZP CSI-RS based IMR is semi-statically set, but in the NR system, a method of dynamically setting a ZP CSI-RS based IMR may be supported. For example, a ZPS CSI-RS-based aperiodic IMR, semi-persistent IMR, and/or periodic IMR method may be used.

Accordingly, for channel estimation (or channel measurement), interference estimation (or interference measurement), and reporting for CSI measurement and reporting, a combination of operation types of various time-domains may be considered. For example, the aperiodic CSI reporting may be set together with an aperiodic/semi-persistent/periodic NZP CSI-RS for channel measurement and an aperiodic/semi-persistent/periodic ZP CSI-RS for interference measurement. In another example, the semi-persistent CSI reporting may be set together with a semi-persistent/periodic NZP CSI-RS for channel measurement and a semi-persistent/periodic ZP CSI-RS for interference measurement. As another example, periodic CSI reporting may be set together with a periodic NZP CSI-RS for channel measurement and a periodic ZP CSI-RS for interference measurement.

In the present specification, 'A/B' means A or B, and a combination in which the order is changed may be considered for '/'. For example, 'A/B and C/D' may mean 'A and C', 'A and D', 'B and C', or 'B and D'.

In the examples, it was assumed that an aperiodic RS and/or IMR (e.g., aperiodic NZP CSI-RS and/or aperiodic ZP CSI-RS) are(is) used only for aperiodic reporting and that a semi-persistent RS and/or IMR (e.g., semi-persistent NZP CSI-RS and/or semi-persistent ZP CSI-RS) are(is) used only for non-periodic or semi-persistent reporting and that a periodic RS and/or IMR (e.g., periodic NZP CSI-RS and/or periodic ZP CSI-RS) are(is) used for all reporting. However, the present invention is not limited thereto and may be set to various combinations (e.g., semi-persistent reporting set together with an aperiodic RS and/or IMR).

Further, both the RS and the IMR are included in resource setting, and use of the corresponding resource (e.g., for channel estimation or interference estimation) may be indicated through setting of each link in measurement setting.

Further, when the aperiodic CSI reporting is performed in an uplink data channel (e.g., Physical Uplink Shared Channel (PUSCH)), the following schemes may be considered.

First, the corresponding CSI reporting may be set to be multiplexed with uplink data transmitted through an uplink data channel. In other words, the CSI reporting and the uplink data may be transmitted together through the uplink data channel.

Alternatively, only the corresponding CSI reporting may be set to be transmitted through the uplink data channel without uplink data.

Such schemes may be commonly applied not only to an uplink data channel but also to an uplink control channel (e.g., Physical Uplink Control Channel (PUCCH)).

In the NR system, two types of uplink control channels (e.g., PUCCHs) may be considered. The two types of uplink control channels may be referred to as a short PUCCH and a long PUCCH, respectively.

Here, the short PUCCH occupies one or two OFDM symbols on a time axis and may be transmitted on a frequency axis using one or more Physical Resource Blocks (PRBs). For example, the short PUCCH may be designed as fast ACK/NACK feedback use (or purpose) for downlink data (DL data) in the above-described self-contained slot structure (e.g., FIG. 5).

However, the long PUCCH occupies 4 to 12 OFDM symbols on the time axis and may be transmitted on the frequency axis using one or more PRBs. For example, the long PUCCH may be designed for ACK/NACK and/or CSI feedback by occupying a specific resource for each UE, similar to the existing PUCCH (e.g., PUCCH in the LTE system).

In this case, that the number of minimum symbols of the long PUCCH is 4 may be related to consideration of various slot structures in the NR system. For example, the number of OFDM symbols included in one slot in the NR system may be set to 14 or 7.

Further, in the case of a slot structure, various structures such as a DL dominant structure or an UL dominant structure as well as a downlink (DL) and/or uplink (UL) may be considered. For example, the downlink dominant structure means a structure in which a PDCCH, a PDSCH, and a short PUCCH coexist in a slot, and the uplink dominant structure may mean a structure in which a PDCCH and a PUSCH coexist in a slot.

Further, a plurality of formats may be defined for a short PUCCH and/or a long PUCCH having the same symbol number, and a size of a payload that may be transmitted for each format may be set differently. For example, multiple short PUCCH formats and/or multiple long PUCCH formats may be defined according to the maximum UE number or a channel coding scheme that may be multiplexed.

As described above, in an existing LTE(-A) system, aperiodic CSI reporting and periodic CSI reporting are supported, and the UE is set to perform CSI reporting through a PUSCH and a PUCCH, respectively. However, the above-mentioned semi-persistent CSI reporting was not supported in the existing LTE(-A) system.

Alternatively, in the case of the NR system, aperiodic CSI reporting, periodic CSI reporting, and semi-persistent CSI reporting through the PUSCH and/or the PUCCH may be considered. For example, in the case of the NR system, the UE may be set to perform aperiodic CSI reporting through the PUSCH.

In this case, as in the conventional LTE(-A) system, even in the NR system, use (or purpose) of the PUSCH may be classified as follows.

PUSCH for only transmission of UL data (hereinafter, first PUSCH use)

PUSCH for UL data transmission and CSI reporting (hereinafter, second PUSCH use)

PUSCH for only CSI reporting (hereinafter, third PUSCH use)

In this way, use of the PUSCH may be set according to the type of information allocated (or transferred) to the corresponding channel (i.e., uplink data channel). Here, the type of the information may be classified according to whether CSI reporting is allocated to the corresponding channel, whether CSI reporting and UL data are allocated, or whether UL data are allocated. That is, the type of the information may be classified into 'CSI reporting only type', 'CSI reporting+UL data transmission type', or 'UL data transmission only type'.

In general, when the PUSCH is allocated, the eNB may indicate through downlink control information (DCI) whether use of the corresponding PUSCH corresponds to one of the three uses.

For example, use of the PUSCH may be indicated by a combination of a CSI request field and a UL Modulation and Coding Scheme field (UL MCS field) of DCI format 0 and DCI format 4 for PUSCH allocation. Specifically, when aperiodic CSI reporting is triggered by the CSI request field and when the UL MCS field is an index corresponding to 'MCS=null value', use of the PUSCH may represent third PUSCH use. Further, when aperiodic CSI reporting is triggered by the CSI request field and when the UL MCS field is a value indicating a particular MCS, use of the PUSCH may represent second PUSCH use. Further, when aperiodic CSI reporting is not triggered by the CSI request field, use of the PUSCH may represent first PUSCH use.

Such a method may be commonly applied to the NR system.

Further, in the conventional LTE(-A) system, the PUSCH was allocated to fixed timing from a reception time point of DCI. For example, when the UE receives DCI for PUSCH allocation in an n-th subframe, the UE may be set to transmit the PUSCH in a (n+4)th subframe.

Alternatively, in the case of the NR system, a time point at which the PUSCH is allocated (i.e., PUSCH transmission timing) may be dynamically indicated by the DCI or the like. Thereby, in the NR system, more flexible PUSCH transmission may be performed.

For example, timing (i.e., timing offset) between UL assignment and the corresponding UL data transmission may be indicated by a field of the DCI among a plurality of values, and the plurality of values may be set through upper layer signaling. Such a scheme may be commonly applied to timing between DL assignment and the corresponding DL data transmission and timing between DL data reception and ACK/NACK transmission for the corresponding DL data.

In this regard, in the NR system, for fast CSI acquisition, more flexible CSI feedback timing may be considered.

In this case, information transferred through CSI reporting may be very variously set in consideration of an amount of the corresponding information or a required computation time. For example, a required CSI computation amount and a computation time may be changed according to whether PMI is included in the CSI reporting information, the number of CSI-RS antenna ports when the PMI is reported, and/or a codebook type.

Accordingly, a CSI reporting offset value (or range of the corresponding value) supported according to each condition may be set differently, and in order to set PUSCH transmission timing, such a CSI reporting offset value may need to be considered. Here, the CSI reporting offset may mean a time required for the UE to perform CSI reporting. For example, the CSI reporting offset may be set in slot units (e.g., slot offset).

In particular, in the embodiments of the present specification, in relation to setting of PUSCH transmission timing, a case of considering an aperiodic CSI reporting offset is assumed. Here, the aperiodic CSI reporting offset may mean a time required for the UE to perform aperiodic CSI reporting.

Hereinafter, for convenience of description, the aperiodic CSI reporting offset may be referred to as 'Y'. However, the embodiments in the present specification may be commonly applied not only to an aperiodic CSI reporting offset but also to periodic CSI reporting and/or semi-persistent CSI reporting.

Further, in order to set the above-described PUSCH transmission timing, not only a CSI reporting offset but also an offset required for UL data transmission needs to be considered. This is because the PUSCH in the NR system may be used for the first PUSCH use (i.e., PUSCH only for transmission of UL data) or the second PUSCH use (i.e., PUSCH for transmission of UL data and CSI reporting).

Here, the offset required for UL data transmission may mean a time required for the UE to transmit UL data through the PUSCH and correspond to a timing offset for transmitting the PUSCH for the first PUSCH use. For example, the offset required for UL data transmission may be set in a slot unit (e.g., slot offset).

Hereinafter, for convenience of description, an offset required for the UL data transmission may be referred to as 'Z'. Hereinafter, in the embodiments of the present specification, it is assumed that a range of a value Z is set through upper layer signaling (i.e., upper layer message) and that the value Z to be actually applied is indicated by the DCI. That is, values of Z (i.e., Z candidate values) may be set through higher layer signaling, and any one of the values may be set to be indicated by the DCI.

The present specification suggests methods of setting and/or indicating PUSCH timing (i.e., PUSCH transmission timing) according to three uses of the PUSCH (e.g., first PUSCH use, second PUSCH use, and third PUSCH use) in consideration of the aperiodic CSI reporting offset (i.e., Y) and an offset (i.e., Z) required for UL data transmission.

Further, for convenience of description, the embodiments of the present specification are described based on a PUSCH, but may be extended and applied to other uplink channels (e.g., PUCCH, short PUCCH, and long PUCCH) or downlink channels (e.g., PDCCH, PDSCH).

Further, the embodiments described below are distinguished for convenience of description and some configurations and features of some embodiments may be included in other embodiments or may be replaced with corresponding configurations or features of other embodiments.

First Embodiment

A method of individually setting or defining a settable PUSCH timing value, a minimum value, and/or a range (i.e., maximum value) of the first PUSCH use and the third PUSCH use for each use may be considered. Here, as described above, PUSCH timing means a time (e.g., time of a slot unit) required for the UE to transmit a PUSCH (i.e., may be referred to as a PUSCH timing offset).

In this case, a configuration of a PUSCH timing value, a minimum value, a maximum value, and/or a range of the second PUSCH use may be set by one of the following four methods.

Method 1: Method of setting with the same setting as that to PUSCH timing of the third PUSCH use Method 2: Method of setting according to information related to PUSCH timing of the third PUSCH use Method 3: Method of setting separately from setting of PUSCH timing for first PUSCH use and third PUSCH use Method 4: Method of coupling and setting settings for PUSCH timing for the first PUSCH use and PUSCH timing for third PUSCH use When the PUSCH is used for CSI feedback use (i.e., the second PUSCH use and/or the third PUSCH use), the PUSCH timing value, the minimum value, and/or the range may be specified in advance according to specific conditions related to a configuration of CSI feedback information and the number of CSI-RS antenna ports or may be set for each CSI reporting setting. Here, when the PUSCH timing value, the minimum value, and/or the range are set for each CSI reporting setting, the PUSCH timing value, the minimum value, and/or the range may be limitedly set to value(s) satisfying the minimum value requirement according to the above-mentioned conditions.

For example, when PMI is not included in CSI feedback, a minimum value of PUSCH timing may be set to '0'. Alternatively, when PMI related to N-port CSI-RS or less is included in the CSI feedback and subband PMI is not included in the CSI feedback, a minimum value of PUSCH timing may be set to '1'. However, when PMI related to an N-port CSI-RS or more is included in the CSI feedback and the subband PMI is included in the CSI feedback, the minimum value of PUSCH timing may be set to '2'.

Setting related to such a condition may be defined on the system or the eNB may transmit the setting to the UE through an upper layer message. Here, the setting may mean setting for a condition itself and/or a PUSCH timing value corresponding to each condition. Further, the eNB may select a specific value among values satisfying the above-described minimum value requirement for CSI reporting setting and set the selected value to the UE.

First, when the method 1 is applied, for the second PUSCH use and the third PUSCH use, the UE may receive setting (or indication) of the same PUSCH timing value, minimum value, and/or range under the same condition.

Alternatively, when the method 2 is applied, for the second PUSCH use and the third PUSCH use, the UE may receive setting (or indication) of the difference between the PUSCH timing value, the minimum value, and/or the range.

For example, information related to PUSCH timing for the third PUSCH use may correspond to information on a shift value of a minimum value and/or a maximum value of a settable PUSCH timing or information on a PUSCH timing value to be added/deleted. Specifically, the PUSCH timing for the second PUSCH use may be set to a value (i.e., K slot delay) to which the K number of slots are added based on the PUSCH timing for the third PUSCH use. Alternatively, the PUSCH timing for the second PUSCH use may be set to follow the PUSCH timing for the third PUSCH use, except when 'timing offset=0'.

Information related to the PUSCH timing for the third PUSCH use may be commonly set to CSI reporting setting or may be set for each set of specific CSI reporting setting.

Alternatively, when the method 3 is applied, the UE may receive setting (or indication) of a separate PUSCH timing value, minimum value, and/or range according to three uses of the PUSCH.

In the method 2, association information may be defined as a predetermined specific rule/value. For example, a range (or minimum value) of a PUSCH timing value that may be allocated to the use 2 may be defined to be added by a promised offset value, compared with a range (or minimum value) of a PUSCH timing value that may be allocated to the use 2.

The promised offset value may be, for example, the fixed slot number (e.g., 1 slot), the slot number corresponding to a fixed absolute time (e.g., 1 msec) and a specific value (e.g., minimum value of use 1 PUSCH timing) determined by the PUSCH timing value set to use 1.

In particular, when the method 4 is applied, a combination of setting for the PUSCH timing for the first PUSCH use and setting for PUSCH timing for the third PUSCH use may be defined by one of the following methods according to UE capability.

First, a method of determining a minimum value of PUSCH timing for the second PUSCH use to a larger value among a minimum value of the settable value Z and a minimum value of the value Y may be considered. For example, when aperiodic CSI reporting and UL data transmission are performed together through the PUSCH, a minimum value of transmission timing of the PUSCH may be set to a larger value among a minimum value of an aperiodic CSI reporting offset and a minimum value of an offset required for UL data transmission.

Additionally, a maximum value of PUSCH timing for the second PUSCH use may be determined to a smaller value among a maximum value of the settable value Z and a maximum value of the value Y.

A UE belonging to the corresponding method may mean a UE capable of performing in parallel an encoding processing of UL data and a CSI computation processing.

Next, a method of determining a minimum value of PUSCH timing for the second PUSCH use to the sum of a minimum value of the settable value Z and a minimum value of the value Y may be considered. For example, when aperiodic CSI reporting and UL data transmission are performed together through the PUSCH, a minimum value of transmission timing of the corresponding PUSCH may be set to the sum of a minimum value of an aperiodic CSI reporting offset and a minimum value of an offset required for UL data transmission.

Additionally, a maximum value of PUSCH timing for the second PUSCH use may be determined to the sum of a maximum value of the settable value Z and a maximum value of the value Y.

A UE belonging to the corresponding method may mean a UE that may not perform (i.e., may perform in a serial manner) in parallel an encoding processing of UL data and a CSI computation processing.

In this case, it may be necessary that the UE reports UE capability information representing a processing capability of UL data and/or CSI computation thereof to the eNB.

In the case of the above-described method, because both a timing offset required for CSI reporting and a timing offset required for transmitting UL data are considered, there is a merit that any one of CSI reporting and transmission of the UL data may be performed without being dropped.

Second Embodiment

As described above, in the NR system, a timing offset (i.e., timing offset for PUSCH transmission of first PUSCH use, Z) for transmission of UL data may be dynamically indicated through DCI within a range set by upper layer signaling.

In this case, although other signaling mechanisms (e.g., MAC-CE) may be applied to second PUSCH use and third PUSCH use, a method of setting to commonly use the same signaling mechanism (i.e., combination of upper layer signaling and DCI) as that of first PUSCH use may be considered. This may be efficient considering that the PUSCH is the same physical layer channel regardless of use thereof and that a field of DCI related to PUSCH timing (i.e., PUSCH transmission timing) may be defined.

Taking this into consideration, a method of indicating PUSCH timing through the same DCI field regardless of use, but separately setting a PUSCH timing value indicated by each DCI code point according to use of the PUSCH may be considered. That is, even in the same DCI code value, a target (or content) indicated by the corresponding code value may be set differently according to the PUSCH use.

Here, the DCI code value may mean a value represented by the DCI field. For example, when the corresponding DCI field is set to 2 bits, the DCI code value may be one of '00', '01', '10', or '11'.

In this case, mapping setting (e.g., mapping table) between the DCI code value and PUSCH timing according to the PUSCH use is predefined and fixed on a system or the eNB may set and/or update the corresponding mapping setting through higher layer signaling (e.g., RRC signaling, MAC-CE signaling).

In this case, mapping setting for the second PUSCH use may follow either the first PUSCH use or the third PUSCH use or may be separately set (or indicated).

Table 6 represents an example of a mapping table between the DCI code value and PUSCH timing according to the PUSCH use.

TABLE 6

| DCI code point | PUSCH timing offset (use 1) | PUSCH timing offset (use 3) |
|---|---|---|
| 00 | Z1 | Y1 |
| 01 | Z2 | Y2 |
| 10 | Z3 | Y3 |
| 11 | Z4 | Y4 |

For example, when the UE receives allocation of the PUSCH of the first PUSCH use, that a code value of a DCI field related to PUSCH timing received by the UE is '01' may mean that a PUSCH timing value for the PUSCH is indicated to 'Z2'. Alternatively, when the UE receives allocation of the PUSCH of the third PUSCH use, that a code value of the DCI field related to PUSCH timing received by the UE is '01' may mean that the PUSCH timing value of the PUSCH is indicated to 'Y2'.

Further, in the present embodiment, mapping setting for second PUSCH use and third PUSCH use (e.g., when a mapping table is set by RRC signaling) or a range of PUSCH timing (e.g., when a mapping table is set by MAC-CE) that may indicate through mapping setting may be set separately through higher layer signaling (e.g., RRC signaling) for each CSI reporting setting.

For example, for CSI reporting setting #n, a range of a PUSCH timing value supported in the second PUSCH use and a range of a PUSCH timing value supported in the third PUSCH use may be respectively set. Alternatively, for CSI reporting setting #n, information representing relevance between PUSCH timing of the second PUSCH use and PUSCH timing of the third PUSCH use may be respectively set. Here, the information representing relevance may include information on a transition value of a minimum value and/or a maximum value of the PUSCH timing or information on a PUSCH timing value to be added/deleted.

Further, in the present embodiment, mapping setting for the second PUSCH use and the third PUSCH use or a range of PUSCH timing that may be indicated through the mapping setting may be predefined according to a specific condition related to a configuration of CSI feedback information and the number of CSI-RS antenna ports.

For example, in the PUSCH for the third PUSCH use, when PMI is not included in CSI feedback, 3-bit DCI (or 3-bit DCI field) indicating PUSCH timing may be set to indicate PUSCH timing offsets 0 to 7. Alternatively, in the PUSCH for the third PUSCH use, when PMI related to an N-port CSI-RS or less is included in CSI feedback and subband PMI is not included in CSI feedback, 3-bit DCI (or 3-bit DCI field) indicating PUSCH timing may be set to indicate PUSCH timing offsets 1 to 8. Alternatively, in the PUSCH for the third PUSCH use, when PMI related to the N-port CSI-RS or lower is included in the CSI feedback and the subband PMI is included in the CSI feedback, 3-bit DCI (or 3-bit DCI field) indicating PUSCH timing may be set to indicate PUSCH timing offsets 2 to 9.

For another example, in the PUSCH for the second PUSCH use, when PMI is not included in CSI feedback, 3-bit DCI (or 3-bit DCI field) indicating PUSCH timing may be set to indicate PUSCH timing offsets 1 to 8. Alternatively, in the PUSCH for the second PUSCH use, when PMI is included in CSI feedback, 3-bit DCI (or 3-bit DCI field) indicating PUSCH timing may be set to indicate PUSCH timing offsets 2 to 9.

In this way, according to use of the PUSCH and/or the above-described specific conditions, mapping setting or a range of PUSCH timing that may be indicated through the mapping setting may be separately set or defined.

In the method proposed in the present embodiment, because timing of various PUSCH uses may be indicated using a common DCI field, a DCI overhead can be small and a blind decoding overhead of the UE can be reduced.

Third Embodiment

In the above-described second embodiment, a method of indicating different PUSCH timings (e.g., value Y) in a single DCI field (i.e., common DCI field regardless of use) through at least two mapping settings (e.g., mapping table) was proposed.

Alternatively, the eNB may indicate PUSCH timing based on a common mapping setting (e.g., mapping table) regardless of use, but a range of PUSCH timing values may be set differently (or defined) according to each use. Hereinafter, the method will be described in detail.

Specifically, a method of commonly setting a PUSCH timing value that indicates PUSCH timing (i.e., PUSCH transmission timing) through the same DCI field regardless of use of the PUSCH and indicated by each DCI code value (DCI code point) regardless of use of the PUSCH may be considered.

In this case, PUSCH timing values or ranges that may be supported may be differently set (or indicated) (through higher layer signaling) or may be defined by specific rules according to specific conditions related to each PUSCH use and/or a configuration of CSI feedback information, and the CSI-RS antenna port number.

In this case, when the UE receives an indication of a PUSCH timing value that does not satisfy a predefined or preset condition for indicated PUSCH use, the corresponding UE may not transmit the PUSCH allocated at the corresponding timing or may not use the PUSCH at the corresponding use.

Alternatively, in this case, the UE uses the PUSCH for the indicated use, but instead of CSI information measured based on the indicated CSI-RS, the same information as the most recently reported CSI information, CSI information calculated based on a measured value at (up to) the CSI-RS time point satisfying the CSI timing requirement among the previously received CSI-RSs, or a value predefined to transmit in such a situation may be transmitted. For example, the predefined value may include a null value, a lowest CQI value, and the like. Further, the UE may report to the eNB that an error has occurred in the PUSCH timing.

In the present embodiment, mapping setting (e.g., mapping table) between the above-described DCI code value and PUSCH timing may be determined according to a predefined rule. Alternatively, the eNB may set or update the corresponding mapping setting through higher layer signaling (e.g., RRC signaling, MAC-CE).

Further, in the present embodiment, the UE may use a PUSCH allocated by the eNB as a use different from indicated use.

For example, it is assumed that the UE receives an indication to use the PUSCH for the second PUSCH use, but that a PUSCH timing value is out of a range of a PUSCH timing value set for the second PUSCH use. In this case, the UE may be set not to perform CSI reporting while using the PUSCH resource as the first PUSCH use (i.e., PUSCH for UL data transmission) or may be set to perform CSI reporting through another uplink resource (e.g., PUSCH or PUCCH of another timing).

Specifically, it is assumed that the UE receives an indication of resource allocation information of the PUSCH and PUSCH timing information and CSI reporting triggering (or in the same slot), but that the indicated information does not satisfy requirement of CSI reporting timing (i.e., CSI transmission timing).

In this case, when the UE transmits the PUSCH only for first PUSCH use, CSI information, which is the UL control information, is not piggybacked in the PUSCH, and all PUSCH resources may be set to be used for UL data transmission. Alternatively, when the UE uses the PUSCH for second PUSCH use, but when a periodic CSI-RS or a semi-persistent CSI-RS is set, the corresponding UE may transmit CSI information calculated based on a measured value at (up to) a CSI-RS time point satisfying requirement of CSI report timing. Alternatively, the UE may transmit again CSI information reported at previous timing or may transmit a value (e.g., Null value, lowest CQI value) predefined to transmit in this situation.

In the method described in the present embodiment, because timing of each of various PUSCH uses may be indicated through a common DCI field, there is an advantage that a blind decoding overhead of the UE can be reduced.

In the above-described second and third embodiments, methods of setting or indicating PUSCH timing of all PUSCH uses using a common DCI field have been proposed.

Alternatively, methods of setting or indicating PUSCH timing using a separate signaling mechanism or separate signaling according to PUSCH use may be considered as in the following embodiments (fourth to sixth embodiments).

Fourth Embodiment

First, a method of indicating a timing offset (i.e., value Z) required for UL data transmission through DCI set to indicate PUSCH timing and setting a value or a range of a CSI reporting offset (e.g., aperiodic CSI reporting offset, value Y) through high layer signaling may be considered.

For example, triggering of resource allocation information and aperiodic CSI reporting for the PUSCH are indicated together through DCI, and when the two values (i.e., the indicated value Z and the preset value Y) correspond to each other, the UE may be set to transmit a PUSCH of indicated timing for second PUSCH use. That is, the UE may perform CSI reporting and UL data transmission through the corresponding PUSCH.

Such an operation may be commonly applied even when the indicated value Z is included in a range of the preset value Y. That is, even when the indicated value Z satisfies a range of the preset value Y, the above-described operation may be applied equally.

In another example, triggering of resource allocation information for the PUSCH and aperiodic CSI reporting are indicated together through DCI, but when the two values do not match, the UE may be set to transmit the PUSCH of indicated timing for first PUSCH use. That is, the UE may perform only transmission of UL data through the PUSCH.

Alternatively, in this case, the UE transmits the PUSCH of the indicated timing for the second PUSCH use, but instead of CSI information measured based on the indicated CSI-RS, the UE may transmit the same information as the most recently reported CSI information, CSI information calculated based on a measured value at (up to) a CSI-RS time point satisfying the CSI timing requirement among the previously received CSI-RSs, or a value (e.g., Null value, lowest CQI value) predefined to transmit in such a situation.

Such an operation may be commonly applied even when the indicated value Z deviates from a range of the preset value Y. That is, even when the indicated value Z does not satisfy a range of the preset value Y, the above-described operation may be applied equally. For example, when the indicated timing offset is insufficient in handling both CSI reporting and UL data transmission, the above-described operations may be applied.

In this case, the UE may process CSI reporting indicated by the eNB according to any one of the following methods 1 to 3.

Method 1

First, the UE may ignore CSI reporting indicated by the eNB. That is, the UE may perform transmission of allocated UL data and/or only non-indicated CSI reporting instead of performing CSI reporting indicated by the eNB.

In this case, the UE may be set to wait for retransmission of CSI reporting triggering DCI while continuing to hold setting information related to a preset aperiodic CSI reporting without resetting with upper layer signaling.

Method 2

Alternatively, the UE may perform CSI reporting indicated by the eNB through a separately allocated PUSCH. In other words, the UE may transmit CSI feedback through an additionally allocated PUSCH instead of the PUSCH previously allocated by the eNB.

In this case, the additionally allocated PUSCH may be set to share resource allocation information of the previously indicated PUSCH. In this case, the UE may perform transmission of UL data and CSI reporting, respectively through the same frequency resource after a slot Z and after a slot Y.

Alternatively, resource allocation information for the additionally allocated PUSCH may be set separately from resource allocation information of the previously indicated PUSCH. In this case, resource allocation information for CSI reporting may also be indicated through higher layer signaling. Alternatively, a separate field for indicating the resource allocation information for the additionally allocated PUSCH may be set to DCI allocating UL data. Alternatively, resource allocation information for the additionally allocated PUSCH may be indicated through separate DCI instead of DCI allocating UL data.

Method 3

Alternatively, the UE may perform CSI reporting indicated by the eNB through a separately allocated PUCCH. In other words, the UE may transmit CSI feedback through an additionally allocated PUCCH instead of the previously allocated PUSCH by the eNB.

In this case, when a range of the value Y is set through upper layer signaling, the UE may be set to transmit a PUCCH from a PUCCH resource (or from the PUCCH resource) of an earliest time point among available PUCCH resources within a preset timing offset range.

Alternatively, when one value Y is set through higher layer signaling, the UE may be set to transmit a PUCCH from the PUCCH resource (or from the PUCCH resource) of the corresponding timing offset. Alternatively, in this case, the UE may transmit a PUCCCH from an available PUCCH resource (or from the PUCCH resource) located at a nearest time point based on the corresponding timing offset.

Here, the available PUCCH resource may be determined by considering whether a time/frequency/sequence resource of the PUCCH is sufficient in transmitting the corresponding CSI reporting as well as whether a PUCCH resource set (or allocated) to the corresponding slot exists. In this case, it may be additionally considered whether the corresponding CSI reporting is sufficient in transmitting once or at multiple times.

In this case, whether the allocated PUCCH resource is sufficient in sending specific CSI reporting may be determined by an association relation of a configuration and information amount of CSI feedback information, a PUCCH resource supported according to coding rate (UCI coding rate) of uplink control information, and a format or a type (e.g., short PUCCH and PUCCH). In this case, information on the association relation may be defined on the system or may be set by the eNB through upper layer signaling.

Further, when CSI reporting information required by the available PUCCH resource is insufficient in transmitting at one time, the UE may divide and transmit CSI reporting information through a plurality of PUCCH resources. In this case, the plurality of PUCCH resources may be set according to a continued slot or a preset (or defined) period. In this case, in order to set the plurality of PUCCH resources, satisfaction of the above-described condition may be considered together.

In the case of the method described in the present embodiment, because UL data transmission and CSI reporting of the UE are determined in consideration of the value Z and the value Y, an overhead of the UE related to PUSCH transmission may be reduced and one of CSI reporting and transmissions of the UL data may be prevented from being inadvertently dropped.

When the PUSCH is allocated to use 2 (UL data+CSI) among uses of the PUSCH, DCI may indicate one value of preset slot timing values (e.g., K2 value) based on use 3 (UL data only transmission).

In this case, when a slot timing value dynamically indicated by the DCI does not guarantee a sufficient time for CSI computation of the UE, the UE may drop the CSI or transmit the CSI through a subsequent PUCCH.

Additionally, among the methods proposed in the first embodiment, when a time (hereinafter, referred to as 'T2') required in order for the UE to transmit together UL data and CSI (UL data+CSI) (for DCI detection/decoding, channel estimation, CSI calculation, CSI encoding and/or data encoding) is greater than (i) a time (hereinafter, referred to as 'T3') required in calculating and transmitting only CSI and (ii) when a timing value indicated by DCI is (equal to or) greater than T3 but is (equal to or) smaller than T2, the UE may transmit only the CSI through the allocated PUSCH resource and may not transmit UL data.

Here, no transmission of UL data may be interpreted as dropping of UL data.

In this case, in the process of mapping a bit sequence (or information) to the allocated PUSCH resource, the UE may not transmit any value to a portion to be transmitted by filling the data (except for the CSI portion) or may map a bit sequence (e.g., all zeros) promised to transmit (or information) in this case and perform modulation and coding (with indicated/promised/set UL MCS) and transmit the bit sequence.

Alternatively, the UE may transmit no value to a portion to transmit by filling encoded data (except for an encoded CSI portion) or may transmit an encoded sequence promised to transmit in this case.

Alternatively, the UE may transmit no value to a portion to be transmitted by filling data RE (except for a CSI RE portion) in an RE mapping process or may transmit a signal promised to transmit in this case.

Additionally, when a timing value indicated by the DCI is (equal to or) smaller than T2 (even if the value is (equal to or) greater than T3), the UE may not transmit both CSI and data.

No transmission of both CSI and data may mean dropping or ignoring both CSI and data.

That is, in this case, the UE may ignore indicated PUSCH allocation information and transmit no signal in the corresponding PUSCH resource.

In this case, when an indicated specific UE is a UE that may transmit CSI and data within an indicated timing value, a value smaller than T3 does not exclude an operation of transmitting the corresponding PUSCH.

Even in this case, as described above, the UE may encode and transmit (with indicated/promised/set UL MCS) a specific information bit sequence promised to transmit in this case (in CSI and data part) as well as a method of ignoring PUSCH allocation information, transmit a specific encoded sequence, or apply and transmit a specific signal to the allocated PUSCH REs.

The T2 may be a minimum time required until transmitting together both UL data and CSI by calculating and encoding after receiving DCI, and T3 may be a minimum time required until transmitting CSI by calculating and encoding after receiving DCI. Further, T2 may be changed to a minimum time required until transmitting UL data by encoding after receiving DCI, and the method may be applied thereto. That is, when PUSCH transmission timing indicated by the DCI is sufficient in calculating/reporting the CSI, but is not sufficient in calculating/reporting UL data, the method may be changed to a method of reporting only CSI, and the method may be applied thereto.

Further, the UE does not expect that a timing value indicated by the eNB with DCI is set to be (equal to or) smaller than T2. As a result, a sufficient time for transmitting together data and CSI is always guaranteed.

The foregoing description may be applied even to the case in which it is assumed that the T3 is equal to T2.

The CSI may include preference beam ID information (e.g., CSI-RS resource indicator, SSB index) and beam quality information (CSI-RS or SSB RSRP) as well as PMI, CQI, and RI.

Fifth Embodiment

Unlike the foregoing description, a method of indicating each of an offset (i.e., value Z) required for transmission of UL data for setting of PUSCH timing and an aperiodic CSI reporting offset (i.e., value Y) through DCI and sharing or setting to separately indicate resource allocation information about a PUSCH related thereto may be considered.

Specifically, when resource allocation information on the PUSCH is shared for UL data transmission and CSI reporting, the UE may perform each of UL data transmission and CSI reporting through the same frequency resource after the slot Z and after the slot Y.

Alternatively, when resource allocation information on the PUSCH is separately indicated for transmission of the UL data and CSI reporting, the UE may transmit UL data after the slot z in a frequency resource indicated by a value of resource allocation information of a PUSCH for UL data transmission. Further, the UE may transmit UL data after the slot Z in a frequency resource indicated by a value of resource allocation information of a PUSCH for CSI reporting.

Alternatively, if the value Z indicated by DCI is equal to the value Y, or if one of two values is omitted, the UE may perform together CSI reporting and UL data transmission in one PUSCH. In other words, in this case, the corresponding UE may be set to transmit the PUSCH for second PUSCH use.

Sixth Embodiment

Alternatively, unlike the foregoing description, a method of indicating each of an offset (i.e., value Z) required for transmission of UL data for setting PUSCH timing and an aperiodic CSI reporting offset (i.e., value Y) through DCI and setting to indicate only one of resource allocation information on a PUSCH related thereto may be considered.

Specifically, when the indicated value Z and value Y are the same, when one of two values is omitted, or when the value Z is larger than the value Y, the UE may be set to perform CSI reporting and UL data transmission through a PUSCH resource indicated by a resource allocation field in a slot corresponding to the value Z. In this case, the PUSCH for the corresponding CSI reporting and transmission of UL data may correspond to second PUSCH use.

Alternatively, when the indicated value Z is different from the value Y or when the value Z is smaller than the value Y, the UE may transmit UL data through a PUSCH resource indicated by a resource allocation field in a slot corresponding to the value Z and perform CSI reporting through the PUSCH resource in the slot corresponding to the value Y. Here, a PUSCH resource in which the UE performs CSI reporting may be indicated by the resource allocation field or may be set through higher layer signaling.

Further, in relation to a CSI reporting offset, only when a predefined (or preset) requirement is always satisfied, the eNB may be set to indicate together CSI reporting while indicating a frequency resource and a time resource of the PUSCH. In this case, the frequency resource may be indicated through resource allocation information, and the time resource may be indicated through a timing offset.

In this case, because the UE may always use a guaranteed CSI computation time, the UE may be set not to expect to receive or not to list a CSI reporting indication deviating from a predefined (or set) CSI reporting timing offset. That is, when the UE performs CSI reporting through the PUSCH or the PUCCH, the UE may be set not to expect to receive a CSI reporting indication in a time shorter than a preset CSI reporting timing offset.

This may be extended and applied to periodic CSI reporting and/or CSI reporting and may be applied to CSI reporting through the PUCCH as well as the PUSCH.

Through embodiments of the present invention, there is an advantage that a sufficient computation time can be secured when the corresponding UE performs CSI reporting and UL data transmission.

Hereinafter, a description related to PUSCH timing for transmitting CSI and/or data proposed in the present specification will be described in detail.

Similar to the PUSCH, PUCCH based aperiodic CSI reporting timing may also be indicated by DCI.

In this case, whether the transmission is PUSCH-based transmission or PUCCH-based transmission may be implicitly distinguished by addition of an explicit indicator or by an RA field.

For example, although reporting triggering has been performed, when a specific value (reserved value or Null value indication) of the RA field is indicated, it may be indicated as PUCCH based reporting.

Alternatively, by designing differently a DCI format according to presence or absence of an RA field, PUSCH based transmission or PUCCH based transmission may be distinguished.

The indicated PUCCH reporting timing may also follow (a portion of) an allowed/disallowed condition (e.g., codebook type, number of CSI-RS ports, CSI feedback contents) of a predefined value Y (based on a PUSCH).

In this case, when there is no available PUCCH resource at indicated timing or when the corresponding timing does not satisfy the allowed/disallowed condition, application of at least one of the following methods is suggested.

(1) Indicated CSI reporting is performed using an available PUCCH resource at an earliest time point among subsequent PUCCH resources, (2) the UE ignores a reporting triggering command and waits for a next indication, or (3) the UE sends a value promised to send to such a situation (e.g., null value, previous CSI reporting value, lowest CQI value, fault message) to the eNB using a PUCCH resource available at an earliest point among subsequent PUCCH resources.

The above methods (1), (2), and (3) may be applied differently according to the above two conditions (allowed/disallowed), PUCCH type, format, and resource.

Hereinafter, a method will be described in detail in which (range of) PUCCH-based aperiodic reporting timing proposed in the present specification is predefined according to a PUCCH type, the number of symbols, a format, a location, and/or a PRB size or is separately set by the eNB.

In NR, there are a short duration PUCCH type (hereinafter, referred to as a 'short PUCCH') configured with one symbol to two symbols and a long duration PUCCH type (hereinafter, referred to as a 'long PUCCH') configured with four to twelve symbols, and a configuration of reportable CSI feedback information may be defined differently according to the PUCCH type, the number of symbols, and/or the PRB size.

For example, a short duration PUCCH may report only wideband CSI, whereas a long duration PUCCH may report subband CSI.

Even in the same time/frequency resource, a payload size that may be transmitted according to the PUCCH format may be changed.

Accordingly, a configuration of supportable CSI information may be influenced.

Further, a location of a PUCCH symbol in the slot may be also varied, and even in the same CSI feedback information, a reporting timing offset may need to be changed according to a location of a PUCCH starting symbol.

Therefore, (range) of a CSI computation time required according to such a PUCCH type, the number of symbols, a format, a location, and/or a PRB size may be calculated in advance.

By specifying (range) of aperiodic reporting timing by a PUCCH type, the number of symbols, a format, a location, and/or a PRB size, a signaling overhead for timing indication may be reduced or eliminated.

When a range is specified, a specific value may be indicated by the eNB through RRC, MAC CE, and/or DCI within the corresponding range or reporting may be performed through a particular resource (e.g., fastest resource, resource randomly selected by the UE) among available PUCCH resources within the range.

CSI Timing

An aperiodic CSI report timing offset Y may be indicated by a downlink control information (DCI) field defined for K2 indication.

A candidate set of values of Y is configured in the RRC, and it is necessary that restriction conditions of Y are defined according to a configuration of CSI related setting.

In the case of an URLLC application, it is necessary that at least one value is supported at Y=0 and Y=1.

Considering complexity of UE implementation, subband PMI reporting and wideband PMI reporting having 2 (or 4) CSI-RS ports or more should not be allowed for Y=0 and Y=1.

When Y=0, if at least one value is supported, use of a short duration PUCCH rather than a PUSCH may be more appropriate in consideration of an NR slot structure.

Data encoding and CSI computation may be simultaneously processed when the UE side embodies a parallel processing such that the conditions for small values of Y need not be separated for two cases of CSI reporting (CSI only or UL data multiplexed together with CSI) on the PUSCH.

Limited conditions for low values of Y are generally applied regardless of whether CSI is multiplexed with data on the PUSCH.

It is natural to set a candidate set of values of Y for each reporting setting.

In this case, values set to all RRCs of Y may satisfy the predefined restriction conditions.

One issue is a method in which the UE may interpret a DCI field when the PUSCH is used for both UL data and CSI reporting.

It is assumed that the RRC sets N values of K2 such as $\{k\_1, \ldots, k\_N\}$ and sets N values of Y for reporting setting $\{y\_1, \ldots, y\_N\}$.

When the UE is indicated to report aperiodic CSI together with UL data, there is ambiguity on a set of values to follow.

One direction to solve this issue is to generate rules for generating DCI tables from two sets of values when CSI and UL data are multiplexed (e.g., only by overlapped values).

The other direction is to follow one set between two preset sets.

In this case, when a value indicated by the DCI does not belong to both sets, an UE operation may need to be further defined.

When the UE interprets a DCI table from K2 values set to the RRC and a value indicated by the DCI does not belong to both sets, the UE may not have a sufficient time for CSI computation so that an UE operation needs to be specified (e.g., transmission of dummy information or previously reported CSI).

Further, when CSI and UL data are multiplexed, the following options may be considered for dynamic PUSCH timing indication.

(Option 1). The DCI table is generated in a set of values set to two RRCs (one set for K2 and another set for Y) (e.g., only overlapped values).

(Option 2). The DCI table is configured with a set that is set to an RRC of values for K2.

(Option 3). The DCI table is configured with a set that is set to an RRC of values for Y.

The above contents may be equally used not only in case of PUSCH but also in case of PUCCH.

Next, a method of indicating (or setting) a timing offset value between the PUSCH and the PUCCH when indicating PUCCH based aperiodic CSI reporting triggering with UL DCI will be described.

More specifically, a DCI field indicating a PUSCH timing offset in the UL DCI may also indicate together a PUCCH timing offset for CSI reporting.

In this case, a difference value between the PUSCH timing offset and the PUCCH timing offset may use a predefined value (e.g., 1 slot, −1 slot) or the eNB may specify the difference value with higher layer signaling (e.g., via RRC and/or MAC CE) or may indicate the difference value with a separate (1 to 2 bit) DCI field (among some values specified to a higher layer).

The PUSCH timing offset indication value may be limited to particular use.

For example, a range of a PUSCH timing offset for UL data transmission is set to $\{0,1,2,3\}$ with RRC and is indicated to one of (0,1,2,3) with 2-bit DCI.

When a defined (or set) slot timing offset value is 1 slot, the UE interprets a slot offset value to be used when reporting aperiodic CSI using the PUCCH to $\{1,2,3,4\}$, respectively.

In this case, when an indicator for indicating aperiodic CSI triggering (on PUCCH) is turned on in UL DCI and PUSCH timing is indicated to a 1 slot, the UE transmits data (and/or CSI for the PUSCH) with the PUSCH (in a frequency resource corresponding to an RA field) after 1 slot of the corresponding DCI reception slot and performs CSI reporting with the PUCCH after 2 slots.

As described above, when simultaneous triggering of the PUSCH and the PUCCH is allowed through UL DCI, a method of implicitly distinguishing PUCCH-based reporting or PUSCH-based reporting through a specific value (indication of a reserved value or a Null value) of the above suggested RA field may not be valid.

In this case, because a separator for distinguishing reporting using a PUCCH or reporting using a PUSCH is included in the aperiodic CSI triggering field, when there is an RA field, it may be distinguished to perform CSI reporting by performing piggyback (or multiplexing) in the PUSCH or to transmit data and to perform CSI reporting using the PUCCH in the PUSCH designated by the RA field.

The separator may be implicitly distinguished by a reporting setting (type) indicator.

That is, when a plurality of reporting setting for performing aperiodic CSI reporting are set to RRC, reporting through the PUSCH or reporting through the PUCCH may be set to each reporting setting (through a type indicator).

In this case, when reporting setting (type) ID is dynamically indicated through DCI and/or MAC CE, interpretation of a (subsequent) aperiodic CSI reporting triggering DCI field may be distinguished to a case of the PUSCH and a case of the PUCCH.

Alternatively, when indicating aperiodic (or semi-persistent) CSI reporting through the PUCCH, an UL DC field is not required and therefore an indication is performed with DL DCI, and when aperiodic (or semi-persistent) CSI reporting is indicated through the PUSCH, an indication may be performed with the UL DCI.

In this case, a DCI field for an aperiodic CSI triggering indication is specified to DL DCI as well as UL DCI, and when an indication is performed through the DL DCI, a PUCCH resource may be dynamically allocated through the RA field (or a separate field).

In this case, when aperiodic CSI reporting triggering is turned on in the DL DCI, the UE may interpret the RA field as information for selecting a specific resource among PUCCH resources (preset by RRC/MAC CE).

When aperiodic CSI reporting triggering is turned off in the DL DCI, the UE may interpret the RA field as PDSCH resource location setting information for DL resource reception.

Methods of distinguishing a PUCCH and a PUSCH for the above-described aperiodic CSI reporting may be also applied to a method of distinguishing a PUCCH and a PUSCH for semi-persistent CSI reporting.

In this case, ON/OFF information of the above-described aperiodic CSI reporting triggering may be changed and applied to ON/OFF information of semi-persistent CSI reporting activation and/or ON/OFF information of semi-persistent CSI reporting deactivation (or release).

Method of Operating a UE

Figure 10:
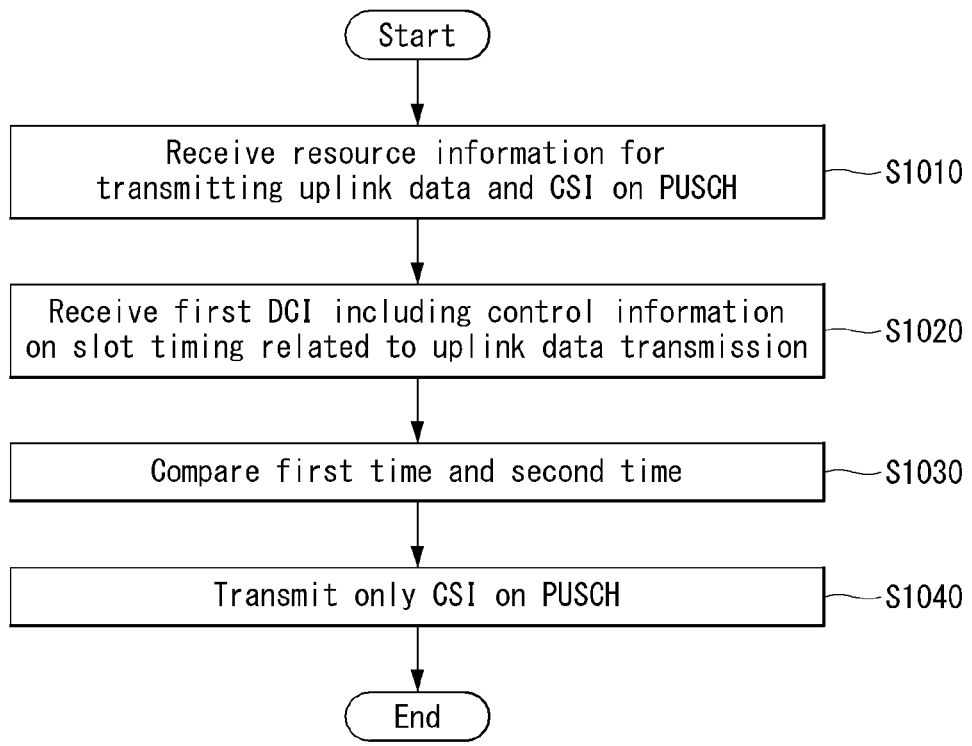
FIG. 10 is a flowchart illustrating a method of operating a terminal for performing a method proposed in the present specification.

FIG. 10 is a flowchart illustrating a method of operating a UE for performing a method proposed in the present specification.

That is, FIG. 10 illustrates operations of a UE for transmitting a signal on a PUSCH in a wireless communication system.

First, the UE receives resource information for transmitting uplink data and channel state information (CSI) on the PUSCH from the eNB (S1010).

The UE receives first downlink control information (DCI) including control information on slot timing related to uplink data transmission from the eNB (S1020).

The UE compares a first time related to computation of the uplink data and the CSI with a second time related to computation of only the CSI (S1030).

The first time may be a time required for transmitting together the uplink data and the CSI after receiving the first DCI, and the second time may be a time required for transmitting only the CSI after receiving the first DCI.

When a value of the slot timing is larger than the second time and smaller than the first time, the UE transmits only the CSI to the eNB on the PUSCH (S1040).

Here, the PUSCH may include a bit sequence of the CSI and a predefined bit sequence.

All of the predefined bit sequence may be 0.

A value of slot timing related to the uplink data transmission may be Y, and a value of the second time may be Z.

The value Z may be received from the eNB through second DCI.

Next, referring to FIG. 10, a specific situation in which the method proposed in the present specification is implemented in the UE will be described.

A UE for transmitting a signal on a PUSCH in a wireless communication system may include a transmitter for transmitting a wireless signal; a receiver for receiving a wireless signal; and a processor functionally connected to the transmitter and the receiver.

The processor of the UE controls the receiver to receive resource information for transmitting uplink data and channel state information (CSI) on the PUSCH from the eNB.

The processor of the UE controls the receiver to receive first downlink control information (DCI) including control information on slot timing related to the uplink data transmission from the eNB.

The processor of the UE compares a first time related to computation of the uplink data and the CSI and a second time related to computation of the CSI only.

The first time may be a time required for transmitting together the uplink data and the CSI after receiving the first DCI, and the second time may be a time required for transmitting only the CSI after receiving the first DCI.

When a value of the slot timing is larger than the second time and smaller than the first time, the processor of the UE controls the transmitter to transmit only the CSI on the PUSCH to the eNB.

The PUSCH may include a bit sequence of the CSI and a predefined bit sequence.

Here, all of the predefined bit sequence may be 0.

A value of slot timing related to the uplink data transmission may be Y, and a value of the second time may be Z.

The processor of the UE may control the receiver to receive the value Z from the eNB through second DCI.

General Device to which the Present Invention May be Applied

Figure 11:
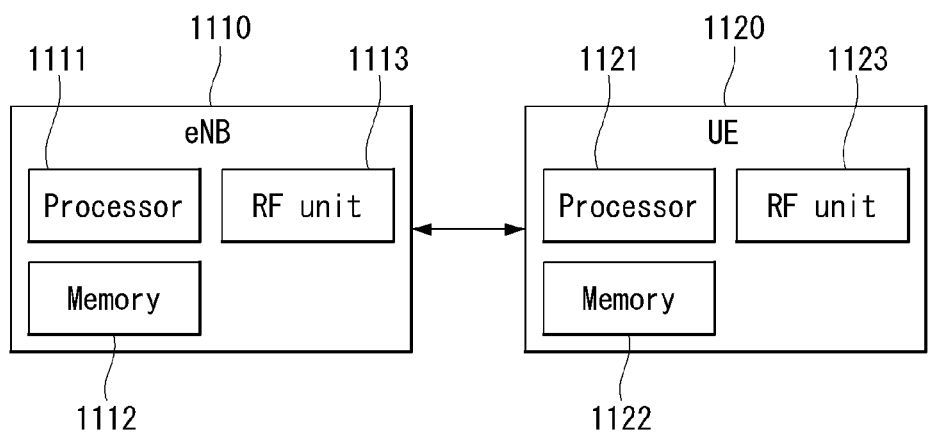
FIG. 11 is a block diagram illustrating a configuration of a wireless communication device according to an embodiment of the present invention.

FIG. 11 is a block diagram illustrating a configuration of a wireless communication device according to an embodiment of the present invention.

Referring to FIG. 11, the wireless communication system includes an eNB (or a network) 1110 and a UE 1120.

The eNB 1110 includes a processor 1111, a memory 1112, and a communication module 1113.

The processor 1111 implements a function, a process, and/or a method suggested in FIGS. 1 to 10. Layers of a wired/wireless interface protocol may be implemented by the processor 1111. The memory 1112 is connected to the processor 1111 to store various information for driving the processor 1111. The communication module 1113 is connected to the processor 1111 to transmit and/or receive a wired/wireless signal.

The communication module 1113 may include a radio frequency (RF) unit for transmitting/receiving a wireless signal.

The UE 1120 includes a processor 1121, a memory 1122, and a communication module (or RF unit) 1123. The processor 1121 implements a function, a process, and/or a method suggested in FIGS. 1 to 10. Layers of a wireless interface protocol may be implemented by the processor 1121. The memory 1122 is connected to the processor 1121 to store various information for driving the processor 1121. The communication module 1123 is connected to the processor 1121 to transmit and/or receive a wireless signal.

The memories 1112 and 1122 may exist at the inside or the outside of the processors 1111 and 1121 and may be connected to the processors 1111 and 1121, respectively, by well-known various means.

Further, the eNB 1110 and/or the UE 1120 may have a single antenna or a multiple antenna.

Figure 12:
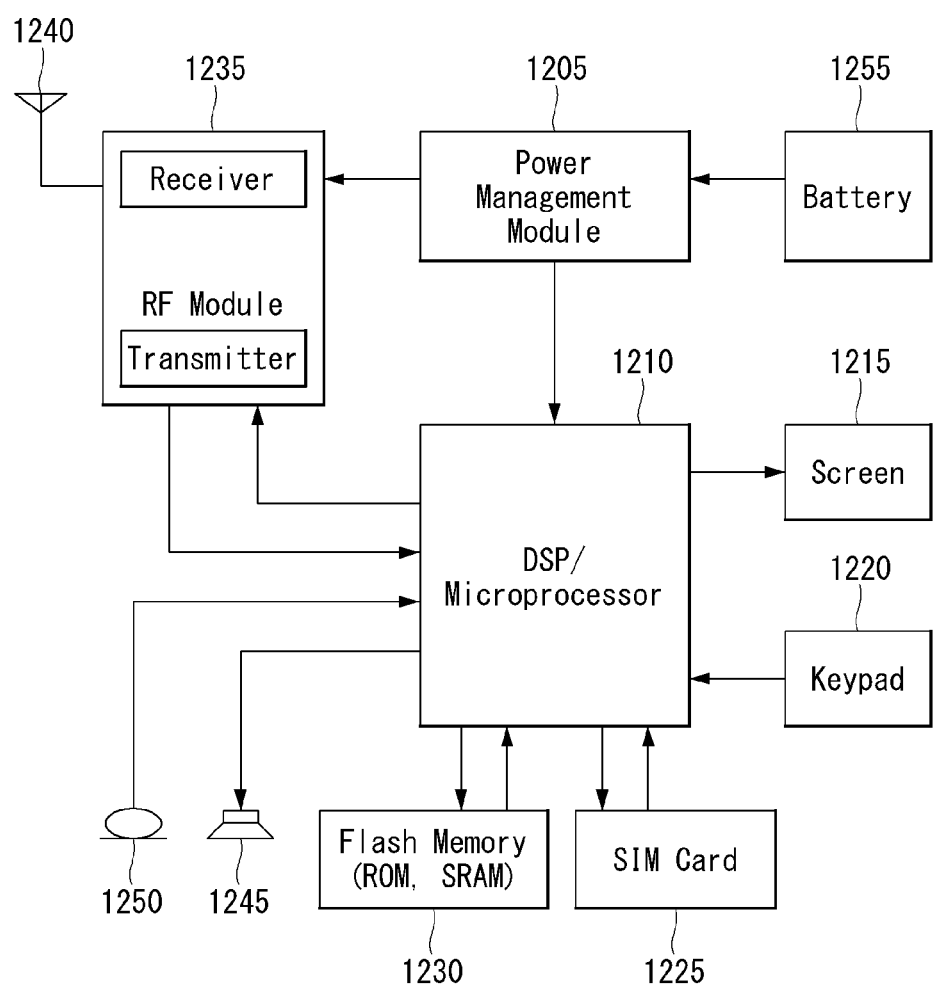
FIG. 12 is a block diagram illustrating a configuration of a communication device according to an embodiment of the present invention.

FIG. 12 is a block diagram illustrating a configuration of a communication device according to an embodiment of the present invention.

In particular, FIG. 12 illustrates the UE of FIG. 11 in more detail.

Referring to FIG. 12, the UE may include a processor (or a digital signal processor (DSP)) 1210, an RF module (or RF unit) 1235, a power management module 1205, an antenna 1240, a battery 1255, a display 1215, a keypad 1220, a memory 1230, a Subscriber Identification Module (SIM) card 1225 (this configuration may be an option), a speaker 1245, and a microphone 1250. The UE may also include a single antenna or multiple antennas.

The processor 1210 implements a function, a process and/or a method suggested in FIGS. 1 to 10. A layer of a wireless interface protocol may be implemented by the processor 1210.

The memory 1230 is connected to the processor 1210 and stores information related to operation of the processor 2210. The memory 1230 may exist at the inside or the outside of the processor 1210 and may be connected to the processor 1210 by well-known various means.

The user inputs, for example, command information such as a phone number by pressing (touching) a button of the keypad 1220 or by voice activation using the microphone 1250. The processor 1210 processes to perform an appropriate function such as reception of such command information and calling with a phone number. Operational data may be extracted from the SIM card 1225 or the memory 1230. Further, for user recognition and convenience, the processor 1210 may display command information or driving information on the display 1215.

The RF module 1235 is connected to the processor 1210 to transmit and/or receive an RF signal. In order to start communication, the processor 1210 transfers, for example, command information to the RF module 1235 in order to transmit a wireless signal constituting voice communication data. The RF module 1235 is configured with a receiver and a transmitter in order to receive and transmit a wireless signal. The antenna 1240 performs a function of transmitting and receiving a wireless signal. When receiving a wireless signal, the RF module 1235 may transfer a signal in order to process by the processor 1210 and convert a signal with a base band. The processed signal may be converted to audible or readable information output through the speaker 1245.

In the aforementioned embodiments, the elements and characteristics of the present invention have been combined in specific forms. Each of the elements or characteristics should be considered to be optional unless otherwise described explicitly. Each of the elements or characteristics may be implemented in such a way as to be not combined with other elements or characteristics. Further, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be configured by combining claims not having an explicit citation relation in the claims or may be included as a new claim by amendments after filing an application.

The embodiment of the present invention may be implemented by various means, for example, hardware, firmware, software or a combination thereof. In the case of implementations by hardware, the embodiment of the present invention may be implemented by one or more application-specific integrated circuits (ASICs), digital signal processors (DSPs), digital signal processing devices (DSPDs), programmable logic devices (PLDs), field programmable gate arrays (FPGAs), processors, controllers, microcontrollers, and microprocessors.

In the case of an implementation by firmware or software, the embodiment of the present invention may be implemented in the form of a module, procedure or function for performing the aforementioned functions or operations. A software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

In the present specification, when a terminal receives an indication or allocation of CSI reporting, a computation time required for the CSI reporting can secured.

Further, in the present specification, at least one of CSI and UL data on a PUSCH can be transmitted in consideration of a computation time of only CSI and a computation time of CSI and UL data.

Effects that may be obtained by the present invention are not limited to the aforementioned effects, and other technical effects not described above may be evidently understood by a person having ordinary skill in the art to which the present invention pertains from the following description.

Although a method of transmitting and receiving signals in a wireless communication system of the present invention has been described with reference to an example applied to a 3GPP LTE/LTE-A system and 5G, the present invention may be applied to various wireless communication systems.

What is claimed is:

1. A method of transmitting, by a terminal, a signal on a Physical Uplink Shared Channel (PUSCH) in a wireless communication system, the method comprising:

receiving, from the base station, first downlink control information (DCI) comprising first control information for a slot timing related to the PUSCH and second control information for triggering transmission of uplink data and channel state information (CSI) together on the PUSCH;

obtaining a first time and a second time, wherein the first time is a time required for the terminal to transmit together the uplink data and the CSI after receiving the first DCI, and the second time is a time required for the terminal to transmit only the CSI after receiving the first DCI; and transmitting, to the base station, only the CSI on the PUSCH based on a value of the slot timing being greater than the second time and less than the first time, wherein a range of the slot timing related to the PUSCH is determined based on a use for the PUSCH;

wherein a minimum value of the slot timing is determined to be the larger value among a minimum value of an offset required for uplink data transmission (Z) configured by the base station and a minimum value of aperiodic CSI reporting offset (Y) configured by the base station, and wherein a maximum value of the slot timing is determined to be the smaller value among a maximum value of the offset required for uplink data transmission (Z) and a maximum value of the aperiodic CSI reporting offset (Y).

2. The method of claim 1, wherein the PUSCH comprises a bit sequence for the CSI and a predefined bit sequence.

3. The method of claim 2, wherein all bits of the predefined bit sequence have a value of 0.

4. The method of claim 1, wherein a value of the second time is received from the base station through second DCI.

5. The method of claim 1, wherein both the uplink data and the CSI are dropped based on the timing offset being less than the first time.

6. A terminal for transmitting a signal on a Physical Uplink Shared Channel (PUSCH) in a wireless communication system, the terminal comprising:

a transmitter for transmitting a wireless signal;
a receiver for receiving a wireless signal; and a processor functionally connected to the transmitter and the receiver, wherein the processor is configured to:

control the receiver to receive, from the base station, first downlink control information (DCI) comprising first control information for a slot timing related to the PUSCH and second control information for triggering transmission of uplink data and channel state information (CSI) together on the PUSCH;

obtain a first time and a second time, wherein the first time is a time required for the terminal to transmit together the uplink data and the CSI after receiving the first DCI, and the second time is a time required for the terminal to transmit only the CSI after receiving the first DCI; and control the transmitter to transmit, to the base station, only the CSI on the PUSCH based on a value of the slot timing being greater than the second time and less than the first time, wherein a range of the slot timing related to the PUSCH is determined based on a use for the PUSCH;

wherein a minimum value of the slot timing is determined to be the larger value among a minimum value of an offset required for uplink data transmission (Z) configured by the base station and a minimum value of aperiodic CSI reporting offset (Y) configured by the base station, and wherein a maximum value of the slot timing is determined to be the smaller value among a maximum value of the offset required for uplink data transmission (Z) and a maximum value of the aperiodic CSI reporting offset (Y).

7. The terminal of claim 6, wherein the PUSCH comprises a bit sequence for the CSI and a predefined bit sequence.

8. The terminal of claim 7, wherein all bits of the predefined bit sequence have a value of 0.

9. The terminal of claim 6, wherein the processor is further configured to control the receiver to receive a value of the second time from the base station through second DCI.

10. The terminal of claim 6, wherein both the uplink data and the CSI are dropped based on the timing offset being less than the first time.

* * * * *